United States Patent
Milner et al.

(10) Patent No.: US 11,783,319 B2
(45) Date of Patent: *Oct. 10, 2023

(54) CLIENT CUSTOMIZED VIRTUAL OR PHYSICAL CARD FOR USE WITH SELECTED MERCHANTS

(71) Applicant: Blackhawk Network, Inc., Pleasanton, CA (US)

(72) Inventors: J. DuWayne Milner, Edwardsville, IL (US); Robert W. Wehrman, Glendale, MO (US); Carl Brad Briscoe, St. Charles, MO (US); Daniel R. Easley, Defiance, MO (US)

(73) Assignee: Blackhawk Network, Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,556

(22) Filed: Apr. 21, 2015

(65) Prior Publication Data

US 2015/0227919 A1    Aug. 13, 2015

Related U.S. Application Data

(63) Continuation of application No. 14/642,662, filed on Mar. 9, 2015, which is a continuation of application (Continued)

(51) Int. Cl.
G06Q 40/00 (2012.01)
G06Q 20/34 (2012.01)
(Continued)

(52) U.S. Cl.
CPC ....... *G06Q 20/3558* (2013.01); *G06Q 20/105* (2013.01); *G06Q 20/342* (2013.01);
(Continued)

(58) Field of Classification Search
CPC ............. G06Q 20/3558; G06Q 20/105; G06Q 20/342; G06Q 20/351; G06Q 20/3572;
(Continued)

(56) References Cited

U.S. PATENT DOCUMENTS 5,477,040 A * 12/1995 Lalonde ............. G06Q 20/4037
 235/375
5,689,100 A   11/1997 Carrithers et al.
(Continued)

FOREIGN PATENT DOCUMENTS

CA        2635500 A1   12/2008

OTHER PUBLICATIONS

Visa and standard chartered bank launch world's first smart card based on global, open technology. (Jun. 2, 1998). PR Newswire Retrieved from https://dialog.proquest.com/professional/docview/666502395?accountid=142257 (Year: 1998).*

(Continued)

*Primary Examiner* — Kito R Robinson
(74) *Attorney, Agent, or Firm* — Barnes & Thornburg LLP; Jerry C. Harris, Jr.

(57) ABSTRACT

A client selects several merchants with whom the card may be redeemed, the amount redeemable, and a design for the card, which is personalized for the card recipient.

22 Claims, 22 Drawing Sheets

Related U.S. Application Data

No. 13/916,651, filed on Jun. 13, 2013, now Pat. No. 8,973,820, which is a continuation of application No. 13/027,623, filed on Feb. 15, 2011, now Pat. No. 8,464,938, which is a continuation-in-part of application No. 12/142,929, filed on Jun. 20, 2008.

(60) Provisional application No. 60/945,814, filed on Jun. 22, 2007.

(51) Int. Cl.
  *G06Q 20/10* (2012.01)
  *G07F 7/10* (2006.01)
  *G06Q 20/40* (2012.01)
  *G06Q 20/06* (2012.01)
  *G06Q 30/00* (2023.01)
  *H04M 15/00* (2006.01)

(52) U.S. Cl.
  CPC ......... *G06Q 20/351* (2013.01); *G06Q 20/354* (2013.01); *G06Q 20/3572* (2013.01); *G06Q 20/40* (2013.01); *G06Q 20/409* (2013.01); *G06Q 40/00* (2013.01); *G07F 7/10* (2013.01); *G06Q 20/06* (2013.01); *G06Q 20/341* (2013.01); *G06Q 20/405* (2013.01); *G06Q 30/00* (2013.01); *H04M 15/715* (2013.01)

(58) Field of Classification Search
  CPC ...... G06Q 20/40; G06Q 20/409; G06Q 40/00; G06Q 20/06; G06Q 20/341; G06Q 20/405; G06Q 30/00; G07F 7/10; H04M 15/715
  USPC ............................................. 235/380; 726/20
  See application file for complete search history.

(56) References Cited

U.S. PATENT DOCUMENTS

| | | | |
|---|---|---|---|
| 5,956,695 A | 9/1999 | Carrithers et al. | |
| 6,202,155 B1* | 3/2001 | Tushie | G06Q 20/341 726/20 |
| 6,298,336 B1 | 10/2001 | Davis et al. | |
| 6,879,965 B2 | 4/2005 | Fung et al. | |
| 7,069,244 B2* | 6/2006 | Strayer | G06Q 20/04 705/35 |
| 7,552,061 B2 | 6/2009 | Richmond | |
| 7,676,409 B1* | 3/2010 | Ahmad | G06Q 20/04 705/35 |
| 7,689,502 B2 | 3/2010 | Lilly et al. | |
| 7,689,507 B2* | 3/2010 | Hung | G06Q 20/10 705/39 |
| 7,702,587 B2* | 4/2010 | Nguyen | G06Q 20/10 705/39 |
| 7,896,237 B2 | 3/2011 | Giesen et al. | |
| 7,967,194 B2 | 6/2011 | Ferrara et al. | |
| 8,285,592 B2* | 10/2012 | Tomchek | G06Q 20/02 235/380 |
| 8,290,858 B1* | 10/2012 | Ankarath | G06Q 40/00 705/35 |
| 8,464,938 B2* | 6/2013 | Briscoe | G06Q 20/105 235/380 |
| 8,973,820 B2 | 3/2015 | Milner et al. | |
| 2001/0034717 A1* | 10/2001 | Whitworth | G06Q 20/341 705/64 |
| 2002/0095387 A1* | 7/2002 | Sosa | G06Q 20/26 705/65 |
| 2002/0156723 A1* | 10/2002 | Lilly | G06Q 20/10 705/38 |
| 2003/0009393 A1 | 1/2003 | Norris | |
| 2003/0028481 A1* | 2/2003 | Flitcroft | G06Q 20/00 705/39 |
| 2003/0046249 A1 | 3/2003 | Wu | |
| 2003/0088462 A1 | 5/2003 | Carrithers et al. | |
| 2003/0097270 A1* | 5/2003 | Musselwhite | G06Q 20/10 705/39 |
| 2003/0204470 A1* | 10/2003 | Manchester | G06Q 20/10 705/39 |
| 2004/0186773 A1* | 9/2004 | George | G06Q 20/10 705/14.27 |
| 2004/0243498 A1 | 12/2004 | Duke | |
| 2005/0247798 A1* | 11/2005 | Graves | G06K 19/04 235/493 |
| 2006/0116955 A1* | 6/2006 | Strayer | G06Q 20/10 705/39 |
| 2006/0190332 A1* | 8/2006 | Grider | B42D 15/045 705/14.27 |
| 2006/0243792 A1* | 11/2006 | Morello | G06K 19/077 235/380 |
| 2006/0259189 A1* | 11/2006 | Perlow | G06Q 30/0237 700/231 |
| 2007/0045406 A1 | 3/2007 | Giesen et al. | |
| 2007/0051797 A1* | 3/2007 | Randolph-Wall | G06Q 20/10 235/381 |
| 2007/0094129 A1* | 4/2007 | Graves | G06Q 20/28 705/38 |
| 2007/0192235 A1* | 8/2007 | Menichilli | G06Q 40/03 705/38 |
| 2007/0215699 A1* | 9/2007 | Arego | G06Q 20/341 235/380 |
| 2007/0267479 A1* | 11/2007 | Nix | G06Q 20/10 235/379 |
| 2007/0267485 A1* | 11/2007 | Ferrara | G06Q 20/10 235/380 |
| 2008/0215470 A1* | 9/2008 | Sengupta | G06Q 40/00 705/35 |
| 2008/0235095 A1* | 9/2008 | Oles | G06Q 30/0225 705/14.26 |
| 2008/0319868 A1* | 12/2008 | Briscoe | G06Q 30/0601 705/26.1 |
| 2009/0037275 A1* | 2/2009 | Pollio | G06Q 20/363 705/14.26 |
| 2009/0132425 A1* | 5/2009 | Hogan | G06Q 20/04 705/76 |
| 2009/0159689 A1* | 6/2009 | Mullen | G06K 19/06206 235/487 |
| 2009/0254462 A1 | 10/2009 | Tomcheck et al. | |
| 2009/0254463 A1* | 10/2009 | Tomchek | G06Q 20/12 705/30 |
| 2010/0100238 A1* | 4/2010 | Torian | G06Q 20/3558 700/233 |
| 2010/0280921 A1 | 11/2010 | Stone et al. | |
| 2011/0178924 A1* | 7/2011 | Briscoe | G06Q 20/105 705/41 |
| 2011/0295744 A1* | 12/2011 | Wisniewski | G06Q 20/105 705/41 |
| 2011/0302084 A1* | 12/2011 | Melik-Aslanian | G06Q 20/10 705/44 |
| 2012/0284172 A1* | 11/2012 | Bryman | G06Q 30/02 705/38 |
| 2014/0258019 A1* | 9/2014 | Cummins | G06O 30/0621 705/26.5 |

OTHER PUBLICATIONS

Villafania, A. F. (Aug. 8, 2001). Philippine bank entices online buyers with E-credit. Newsbytes Retrieved from https://dialog.proquest.com/professional/docview/676179066?accountid=142257 (Year: 2001).*

Using gift certificates & gift cards: A primer. (2004). Potentials, 37(1), 30-32,34. Retrieved from https://dialog.proquest.com/professional/docview/204263176?accountid=131444 on Nov. 4, 2022 (Year: 2004).*

Lucas, P. (2002). A big lift for loyalty. Credit Card Management, 15(3), 26-31. Retrieved from https://dialog.proquest.com/professional/docview/201153005?accountid=131444 on Nov. 4, 2022 (Year: 2002).*

(56) References Cited

OTHER PUBLICATIONS

Bigus, Ruth Baum, "Machine Boosts Sales," The Kansas City Star, Jun. 13, 2006, KansasCity.com, 3 pages.

"Coalition-Based Rewards Programs with Open and Real-Time Redemption Will Transform Rapidly Growing Consumer Loyalty Industry," PR Newswire, http://search.proquest.com/printviewfile?accountid=14753, Dec. 19, 2002, 3 pages, ProQuest LLC.

"Datacard® RP90 Plug-in User's Guide," Datacard, Jun. 2005, 15 pages, DataCard Corporation.

Filing receipt and specification for provisional patent application entitled "System and Method of Creating a Customized Card," by Carl Brad Briscoe, et al., filed Jun. 22, 2007 as U.S. Appl. No. 60/945,814.

Patent application entitled "Debit Card System and Method for Implementing Incentive Award Program," by David C. Carrithers, et al., filed on Mar. 21, 1995 as U.S. Appl. No. 08/408,690.

Paybytouch.com, "Reward & Gift Card Kiosks," Pay by Touch, http://www.paybytouch.com, downloaded from Internet on Apr. 26, 2007, 2 pages.

Office Action dated Apr. 30, 2009 (17 pages), U.S. Appl. No. 12/142,929, filed Jun. 20, 2008.

Office Action (Final) dated Jan. 4, 2010 (18 pages), U.S. Appl. No. 12/142,929, filed Jun. 20, 2008.

Office Action dated Mar. 25, 2011 (19 pages), U.S. Appl. No. 12/142,929, filed Jun. 20, 2008.

Office Action (Final) dated Oct. 25, 2011 (20 pages), U.S. Appl. No. 12/142,929, filed Jun. 20, 2008.

Radigan, Mary, "Woodland mall plan eyes travelers," The Grand Rapids Press, Nov. 16, 1999, 2 pages, ProQuest LLC.

MINI Platinum Visa® Card, "The MINI Card Configurator Demo," www.4myminicard.com, 2007, 1 page, BMW Financial Services NA, LLC dba MINI Financial Services.

Tiosk Card Issuing Kiosk System, www.tiosk.com/index.html, 2002, 2 pages, Tiosk LLC.

Filing receipt and specification for patent application entitled "Client Customized Virtual or Physical Card for Use with Selected Merchants," by J. DuWayne Milner, et al., filed Mar. 9, 2015 as U.S. Appl. No. 14/642,662.

Office Action dated Jul. 29, 2015 (39 pages), U.S. Appl. No. 14/642,662, filed Mar. 9, 2015.

Office Action (Final) dated Jun. 1, 2016 (19 pages), U.S. Appl. No. 14/642,662, filed Mar. 9, 2015.

Office Action dated Dec. 7, 2015 (23 pages), U.S. Appl. No. 14/642,662, filed Mar. 9, 2015.

\* cited by examiner

CLIENT CUSTOMIZED VIRTUAL OR PHYSICAL CARD FOR USE WITH SELECTED MERCHANTS

CROSS-REFERENCE TO RELATED APPLICATIONS

This application is a Continuation Application of U.S. patent application Ser. No. 14/642,662 filed Mar. 9, 2015, which is a Continuation Application of U.S. patent application Ser. No. 13/916,651 filed Jun. 13, 2013, now U.S. Pat. No. 8,973,820, which is a Continuation Application of U.S. patent application Ser. No. 13/027,623, filed Feb. 15, 2011, now U.S. Pat. No. 8,464,938, which is a Continuation in Part Application of U.S. patent application Ser. No. 12/142,929, filed Jun. 20, 2008, which claims priority to U.S. Provisional Application No. 60/945,814 filed on Jun. 22, 2007.

FIELD OF THE INVENTION

The disclosure relates to the creation of physical and virtual cards and to the use of such cards in transactions with merchants.

BACKGROUND

Cards such as credit cards, debit cards, and stored value cards are widely used by cardholders (e.g., consumers) to purchase products and services from merchants. The cards are issued by issuers (e.g., merchants and financial institutions). Many merchants issue the cards to promote consumers to purchase their products and services. Accordingly, merchant issuers offer various features, rewards, incentives, and promotions for enticing consumers to use the cards. One feature commonly offered by merchant issuers allows the consumer to select the appearance of a physical card from a few pre-defined card designs offered by the merchant issuer. However, merchant issuers lack the ability to efficiently allow the consumer to interactively select and combine components of the design to create either a physical card or virtual card aesthetically customized for the client. In addition, merchant issuers lack the ability to efficiently allow the consumer to interactively select and combine several merchants to create a physical or virtual card which is accepted by the several selected merchants.

Additionally, stored value cards, in particular, are awarded by merchants, financial institutions, employers, and other entities as rewards or incentives in motivational and loyalty programs. A stored value card, which may be a physical and/or virtual card, represents money on deposit with the issuer of the card or an affiliate of the issuer. For example, a stored value card may be a gift card issued by a particular merchant and is redeemable with the particular merchant. In another example, the stored value card is a pre-paid debit or credit card which is issued by a credit association (e.g., American Express®) affiliate and is redeemable with particular merchants accepting the credit association brand.

Motivational programs may be administered internally or administered by incentive companies which have contracted with the sponsoring entities (e.g., merchants, financial institutions, and/or employers). Based on various criteria, the participant (e.g., consumer, employee) accumulates a stored value card for a particular amount. For example, a particular sponsoring merchant may reward a consumer with a gift card redeemable for products sold by the merchant if the consumer uses a credit card issued by the merchant to purchase products from the merchant. In another example, a sponsoring employer contracts with an incentive company to administer various stored value cards after an employee has accrued a particular number of points based on the employee's performance. Additional details regarding cards used for implementing incentive award programs are disclosed by U.S. Pat. Nos. 5,689,100 and 5,956,695, the entire disclosures of which are incorporated herein by reference. Although such motivational programs provide rewards/incentives based on an individual participant's performance, the motivational programs fail to allow the sponsor to provide the individual participant with a stored value card customized by the sponsor for the individual participant.

The need for a card giver (e.g., sponsor) to customize the card for the card recipient (e.g., cardholder) similarly applies to stored value cards given as gifts. Stored value cards are commonly purchased by a consumer for gifting to a card recipient. However, currently consumers are unable to efficiently purchase and customize the card to reflect the occasion for the gift and/or personalize the card to reflect the recipient of the gift.

SUMMARY

Embodiments of the present invention provide a method and system for customizing a physical or virtual card for a card recipient. Advantageously, a client may efficiently select several merchants with whom the card may be redeemed, the amount redeemable, and a design for printing on a physical card or a design included as part of a display or screen of a virtual card which is personalized for the card recipient. Additionally, embodiments of the present invention modify the data and/or merchant information, such as merchant logos, which may be selected by a client based on the prospective needs and preferences of the client and/or the card recipient.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
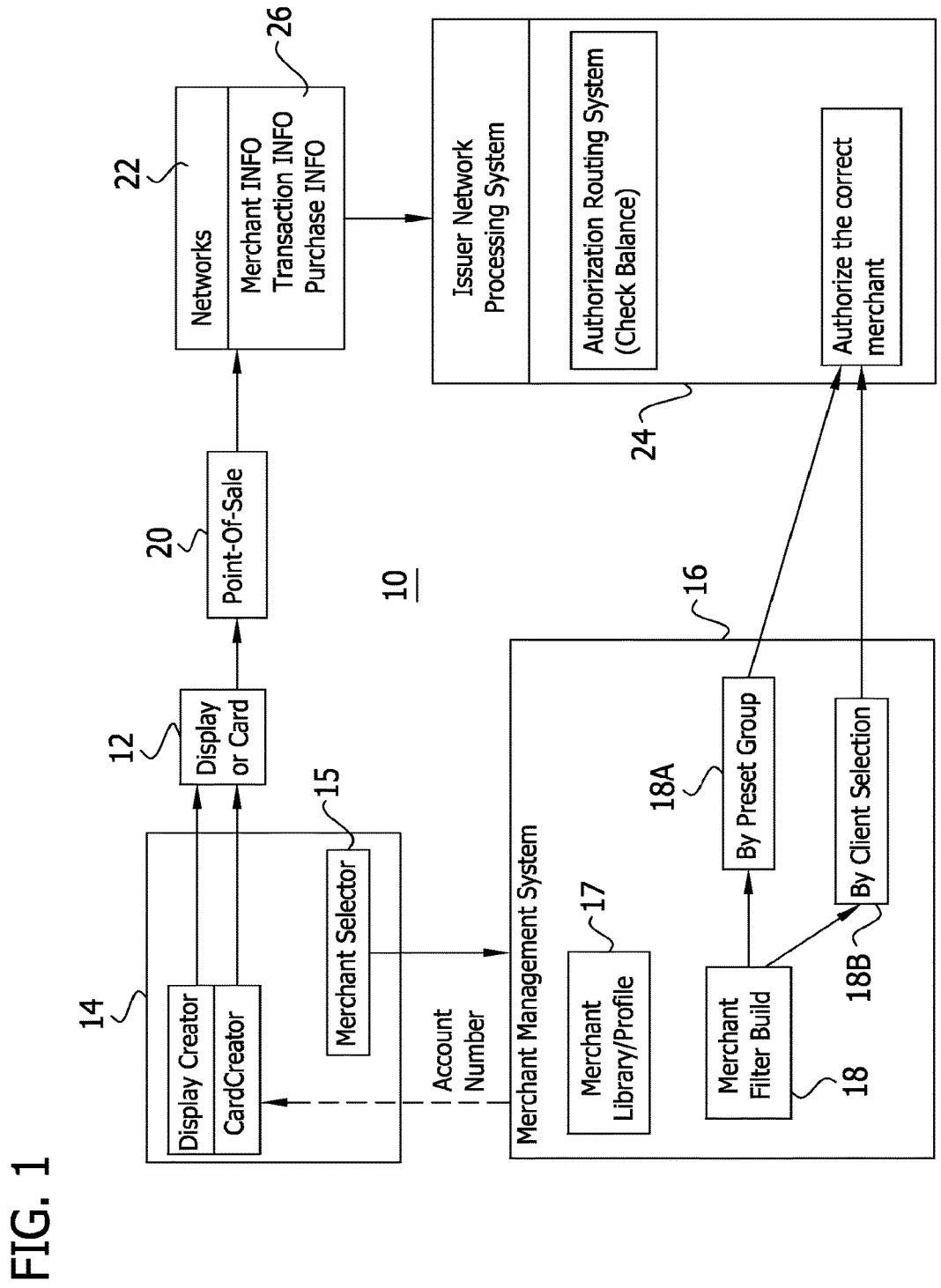
FIG. 1 is a block diagram illustrating an overview of the system for customizing a physical or virtual card and for implementing use of the customized physical or virtual card.

Embodiments of the invention provide a system and method of creating a physical or virtual card representing an account between selected merchants and a cardholder wherein the card is individually customized for the client. In general, the physical or virtual card is customized by a person creating the card that may or may not be the client or cardholder. For simplicity below, it will be assumed that the client is the person customizing the card. In is contemplated that the person creating the physical or virtual card may also be any one or more of the following: someone who uses the card, the cardholder, a sponsor, someone giving the card to a cardholder, or a card recipient. Embodiments of the invention provide an efficient and convenient interactive experience for the client to customize a physical or virtual card. In particular, embodiments of the invention contemplate the diverse needs of clients by allowing clients to specify the merchants, design and/or account parameters of the physical or virtual card. Additionally, embodiments of the invention contemplate the diversity of the clients by customizing the data which may be specified by the client for customizing the physical or virtual card and merchants which redeem (e.g., accept) the customized card.

Unless otherwise specified herein, "card" includes (1) a physical card including a plastic or paper card with a magnetic stripe, bar code or other indicator indicative of an account number or other account indicative information, and/or (2) a virtual card, such as a display or screen shot for a mobile phone or for another portable device (e.g., a flash drive, smart chip, a laptop or portable computer), or for a computer device (e.g., a desktop computer) in combination with data indicative of an account number or other account indicative information. Data associated with the card may include an encrypted or unencrypted account number or other encrypted or unencrypted account indicative information and/or encrypted or unencrypted information associated with a particular client, issuer, creator or group of merchants. It is also contemplated that the card may have multiple embodiments or forms. For example, the card may be a physical card (e.g., in the form of magnetic striped plastic card), a virtual card (e.g., in the form of a display on a smart phone), or both. In the embodiment in which the card is a virtual card, the corresponding account information (e.g., account number) would initially be provided to the client and the client would communicate the account information to the merchant. The virtual card may be communicated by displaying a display or screen shot, and/or by transmitting a signal, such as by using NFC (Near Field Communication) technology or other secure transport technologies to complete the transaction with the selected merchants. Optionally, the virtual card may have a display element (e.g., a bar code or string of numbers) which identifies the account number associated with the card. Alternatively, the virtual card may have display elements relating to the merchants which accept the card. Thus, whether the card is physical or virtual, it communicates account information.

Referring to FIG. 1, a block diagram illustrates an overview of a system 10 for customizing a card 12 and for implementing use of the customized card 12. A card creator 14 such as a kiosk or website supports the overall customization process. A client (not shown in FIG. 1) interfaces with the card creator 14 to navigate to a merchant selector page 15 to select one or multiple merchants that would accept the card 12 and become redemption options for use of the card 12. The card 12 would be assigned a unique account number which would be associated with only the selected merchants. The merchant selector page 15 then transmits the merchant selections and the associated account number to a merchant management system 16 which maintains the appropriate profile 17 and configuration data to establish and manage a commission and a merchant filter 18 associated with the account number (see, for example, U.S. Pat. Nos. 5,689,100 and 5,956,695 regarding merchant filtering). Alternatively, the merchant management system 16 may assign the account number and provide it to the card creator 14. Meanwhile, the card creator produces the card 12 and provides it to the client.

As illustrated in FIG. 1, the card creator 14 includes a display creator. When the card is a physical card, the card creator 14 includes a plurality of plastic cards which are encoded by a processor with the account number and includes a display creator prints the card according to the clients choices. When the card is a virtual card, the card creator 14 includes a processor defining account data and a display creator generating a graphical display representative of the card for display on a mobile or other device according to the client's choices. In the embodiment where the card creator is a kiosk, the card 12 may be a physical card printed and/or coded with the account number and dispensed to the client who would then be able to use it or provide it to a user, in the event that the client is not the user. Alternatively, in the embodiment where the card creator is a kiosk, the card 12 may be a virtual card associated with and/or displaying data with the account number and transmitted to the client who would then be able to use it or provide it to a user, in the event that the client is not the user. In the embodiment where the card creator is a website, the information is communicated by transmission to a fulfillment resource which creates the card 12 either (1) by printing a physical card with the selected background and logo and by coding it with the account number or (2) by creating a virtual card, such as a display or screen shot, with selected background graphics, logo and data indicative of the account number. The resource delivers the card 12 to the client and/or to the user, in the event that the client is not the user. When the card 12 is a physical card, it is physically delivered to the user. When the card 12 is a virtual card, the card display and data are transmitted to a user's device, such as the user's mobile device or computer. As a specific example, many mobile devices (such as smart phones) have displays that approximate in size a physical, plastic card so that the virtual card could be a graphical display on a smart phone that has the same appearance as a physical, plastic card.

Assuming the client is the user for this embodiment, the client uses the card 12 at one of the selected (participating) merchant locations (in store or online as appropriate). At the point of sale 20 of the selected merchant, the account data is input (e.g., the card is swiped, displayed, transmitted or entered via a keyboard or other known entry technique) for validation and authorization. The point of sale 20 (e.g., in store or online) is networked into card networks 22 and would be routed to the correct network processing system 24 of the issuer of the card 12 (e.g., the bin range would forward to the appropriate issuer network processing system 24 for processing). The merchant identification information, transaction information (such as the amount of purchase) and card information 26 (such as account number) are transmitted to the issuer network processing system 24 which authenticates the card number and any expiration date of the account number represented by the card 12, and then validates that sufficient funds exist in the account. Once this process is confirmed, an additional confirmation step is taken to validate that the merchant at the point of sale 20 is one of the selected merchants and is authorized to accept the card. In particular, the issuer network processing system applies the merchant filter 18 to merchant identification information 26.

In one embodiment, a filter 18A is created in response to input from the client. The filter 18A is a list of merchant identification numbers of one or more preset groups of merchants selected by the client. The card creator 14 presents the client with a list of preset groups of merchants and the client can select one or more groups of merchants which will accept the card. For example, a selected preset group of merchants may be a class or set of merchants (e.g., fast food) and the filter 18A is used by the processing system 24 to confirm that the merchant at the point of sale 20 falls within the preset group. The authorization is provided back to the point of sale 20 and the purchase transaction is completed for the client (e.g., cardholder or user).

In another embodiment, a filter 18B is created in response to input from the client. The filter 18B is a list of merchant identification numbers of individual merchants selected by the client. The card creator 14 presents the client with a list of merchants and the client can select one or more merchants which will accept the card. Thus, the merchants which will accept the card or cards are a unique, customized group selected by the client from a list of participating merchants. For example, the client may select merchants CC and DD and the filter 18B is used by the processing system 24 to confirm that the merchant at the point of sale 20 is either merchant CC or merchant DD. The authorization is provided back to the point of sale 20 and the purchase transaction is completed for the client (e.g., cardholder or user). It is also contemplated that the filter may be a combination of filters 18A and 18B, including a list of merchant identification numbers of individual merchants selected by the client and a list of merchant identification numbers of one or more preset groups of merchants selected by the client.

Figure 1A:
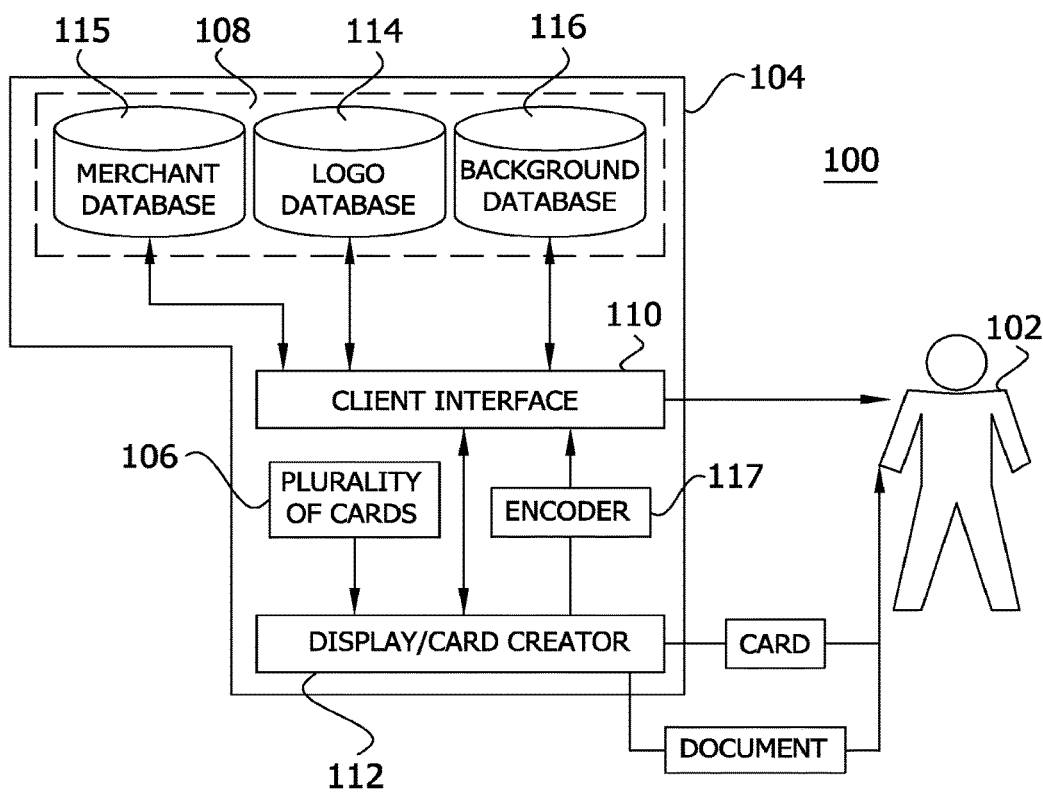
FIG. 1A is a block diagram illustrating a system for creating client-specified display on a physical or virtual card representing an account between a merchant and a cardholder, according to one embodiment of the invention.

Referring to FIG. 1A, a block diagram illustrates a system 100 for interacting with a client 102 to design a card and create a representation of the card with the client selected design for delivery to the client 102. In general when the card is a physical card, the system 100 includes a housing unit (e.g., kiosk 104) which houses a plurality of customizable physical cards 106. Each of the plurality of customizable physical cards 106 represents an account between a cardholder and merchants to be selected by the client when creating the card. A design database 108 stores data for customizing the physical cards. A client interface 110 interacts with the client 102 of the kiosk 104 to customize the physical card. In particular, the client interface 110 is connected to the design database 108 and interacts with the client 102 to select design data from the design database 108 which is printed on a physical form of a physical card to create individualized, customized physical cards according client choices. In the alternative when the card is a virtual card, the system 100 includes a housing unit (e.g., kiosk 104) which houses a processor for defining plurality of customizable virtual cards 106. Each of the plurality of customizable virtual cards 106 represents unique account data between a cardholder and merchants to be selected by the client when creating the card. A design database 108 stores data for customizing the display of the virtual cards to be displayed on a mobile or other device. A client interface 110 interacts with the client 102 of the kiosk 104 to customize the virtual card. In particular, the client interface 110 is connected to the design database 108 and interacts with the client 102 to select design data from the design database 108 which is part of the display of the card to create individualized, customized virtual cards according client choices.

When the card is a physical card, the client interface 110 communicates with a card creator 112 such that the card creator 112 prints material on the card based on the client interaction with the client interface 110. In particular, the card creator 112 prints the selected design data on the card and dispenses the card from the kiosk 104 to the client 102. In one embodiment, the card creator 112 includes an encoder 117 which encodes the magnetic strip of the card with the account number and/or with the selected merchants. Alternatively or in addition, the creator 112 includes a printer which prints the card and/or prints a document for the client 102 including a listing of the selected merchants.

When the card is a virtual card, the client interface 110 communicates with a card creator 112 such that the card creator 112 transmits a display based on the client interaction with the client interface 110 and transmits account data. In particular, the card creator 112 sends the selected design data of the card from the kiosk 104 to a device of the client 102 and sends the account data. In one embodiment, the card creator 112 includes an encoder 117 which encrypts the account data representative of the account number and/or the selected merchants and sends it with the display. Alternatively or in addition, the creator 112 includes a printer which prints a document for the client 102 including a listing of the selected merchants.

In one embodiment, the cards 106, whether physical cards in a dispenser or virtual cards stored in memory, include cards representing pre-existing accounts having a pre-defined amount redeemable with one or more merchants. An amount may be a currency amount or a particular product. For example, the cards may be stored value cards (e.g., gift cards, phone cards, pre-paid credit/debit cards). In another embodiment, the cards 106 additionally or alternatively include cards representing accounts which do not have an amount balance. For example, the cards may be loadable stored value cards which the client or cardholder may load with a balance amount. The card may be loaded via the interface as part of the customizing process or thereafter. In another example, the kiosk 104 may demonstrate features of the present invention discussed herein. The kiosk 104 allows the client to design and provide a prototype card, either physical form or virtual form, or both. In yet another example, the kiosk 104 is used by a merchant issuer of a credit card or debit card. The plurality of cards 106 comprises credit cards and/or debit cards representing an account between the merchant issuer and the cardholder which has not yet been activated. The kiosk 104 allows the client to design and receive a customized credit or debit card and the merchant issuer subsequently activates the account represented by the customized card.

In embodiments of the invention, the design database 108 comprises one or more storage media storing various types of design data for accessing by the client interface 110. In an embodiment, the one or more storage media may be included as an internal component of the client interface 110. Exemplary internal storage media include RAM, ROM, EEPROM, flash memory and/or other internal or external Internet or on-line storage media known in the art. Alternatively, the one or more storage media may components external to the client interface 110 which communicate with the client interface 110. Exemplary external storage media include memory sticks, CD-ROM, digital versatile disks (DVD), magnetic cassettes, magnetic tape, magnetic disks, on-line, Internet and/or other storage media known in the art.

In an embodiment, the design database 108 includes a plurality of databases, each storing a particular type of design data. According to the illustrated embodiment, the design database 108 includes a merchant database 115, a background database 116 and a logo database 114. Although these databases are shown as part of the kiosk 104 it is contemplated that part or all of the databases may be remotely located from the kiosk 104 and connected by a network such as the Internet.

The merchant database 115 includes a listing of merchants who are partnering with the issuer. In one embodiment, merchants or groups of merchants may be pre-assigned to a particular account number. Alternatively or in addition, the client may select from a merchant list. Frequently, the client will select merchants based on the purpose of the card. For example, the client may be a business which owns particular merchants and will be giving the card as a bonus to its employees. Thus, the client would select the particular merchants. As another example, the client may be giving the card to someone who has a special interest such as electronics so that the client would select merchants dealing in the special interest goods such as electronic merchants.

The background database 116 stores a plurality of card backgrounds. The plurality of backgrounds may include backgrounds with various themes (e.g., birthday, performance award or other accomplishment, seasons, holidays). Additionally or alternatively, the plurality of backgrounds may include backgrounds associated with the various entities involved in issuing, customizing, and/or using the card (e.g., watermark of card issuer, image of card giver, image of card receiver/cardholder, and types of products sold by merchants accepting the card).

The logo database 114 stores a plurality of logos. The stored plurality of logos may include logos representing the card giver, the card recipient, a merchant, a credit association, or other party relating to the card. For example, where the card is awarded by an employer to an employee as a performance award, the stored plurality of logos may include one or more logos associated with the employer. The stored logos may include images and/or text. Additionally or alternatively, the client 102 may provide the logo via the client interface 110. The client-provided logo is stored in the logo database 114. The client-provided logo may be permanently stored in the logo database 114 or temporarily stored until the card has been delivered. Additionally or alternatively, the logos may be the logos of the selected merchants.

In an embodiment, the client interface 110 includes an input component for receiving information from the client and an output component for relaying information to the client. In one embodiment, the input component and the output component comprise one device such as a touch screen or an interactive voice response system. In another embodiment, the input component and the output component each comprise separate devices. Exemplary input devices include one or more of the following: keyboard, mouse, trackball, pen, touch pad, microphone, joystick, gamepad, push button, and other input devices known in the art. Exemplary output devices include one or more of the following: monitor, printer, speakers, lights and other output devices known in the art. In an embodiment, the client interface 110 further includes a memory for storing instructions and a processor for executing the stored instructions and Internet access. The processor communicates with the design database 108, the input component, the output component, the memory, and the card creator 112 and executes the stored instructions accordingly. When the card is a virtual card, the interface 110 may include a port, such as a USB port, which would be used to connect to a mobile device of a client, so that the virtual card could be transferred from the interface 110 via the port to the mobile device. Alternatively, when the card is a virtual card, the interface 110 may be connected to network, such as the Internet or a 3G cellular network, so that the virtual card could be transferred from the interface 110 via the network to the mobile device.

According to an embodiment, the client interface 110 interacts with the client 102 to select one or more merchants from the merchant database 115 which will accept (redeem) the card, to select a card background from the background database 116 and to select a logo from the logo database 114. According to one embodiment, the processor executes the stored instructions to display to the client 102 via the output component a plurality of merchants from the merchant database 115. The client 102 selects a one or more merchants via the input component and the processor receives a signal indicating the selected merchants. Similarly, the processor executes and communicates through processor and online means the stored instructions to display to the client 102 via the output component a plurality of card backgrounds from the background database 116. The client 102 selects a displayed card background via the input component and the processor receives a signal indicating the selected card background. Similarly, the processor executes the stored instructions to display to the client 102 via the output component a plurality of logos from the logo database 114. The client selects a displayed logo via the input component and the processor receives a signal indicating the selected logo. In one embodiment, the plurality of logos displayed may be limited to the logos of the selected merchants.

The processor communicates the data received from the client 102 to the card creator 112. The card creator 112 prints a physical card and/or creates a virtual card according to the received client-specified data. Thus, the card creator 112 prints the selected background and the selected logo on the physical card or creates a virtual card including the selected background and the selected logo for a display for a mobile device. The card creator 112 then dispenses the printed physical card to the client 102 or transfers the virtual card to the client's mobile device. In one embodiment, each card has a pre-assigned account number and the client interface 110 communicates the selected merchants to the merchant management system to be used in building the filter and authorizing card use, as noted above with regard to FIG. 1. In another embodiment, when the card is a physical card, the card creator 112 includes an encoder 117 which encodes the magnetic strip of the card with the account number and/or with the selected merchants. Alternatively or in addition, the creator 112 includes a printer which prints the card and/or prints a document for the client 102 including a listing of the selected merchants. In another embodiment, when the card is a virtual card, the card creator 112 includes an encoder 117 which encrypts the account information including the account number and/or with the selected merchants and sends it to the client's mobile device. Alternatively or in addition, the creator 112 includes a link which transmits the virtual card and/or prints a document for the client 102 including a listing of the selected merchants.

According to an embodiment, the client may design a card and instruct via the client interface 110 creation of one or more cards 106 with the specified design. Thus, the present invention advantageously adapts to the needs of each client 102 by allowing the client 102 to conveniently and efficiently create a customized design for printing on a client-specified number of physical cards or for use as virtual cards with a client-specified number of mobile devices. In one embodiment for dispensing physical cards, the card creator 112 comprises a Datacard® RP90 printer and the memory stores aspects of the Datacard® ID Works® identification software and/or Datacard® ViaNet® identity information software for executing by the processor. The Datacard® RP90 printer, the Datacard® ID Works® identification software, and Datacard® ViaNet® identity information software are explained in the Datacard® RP90 Plug-in Client's Guide, the entire contents of which are incorporated herein as Appendix A.

According to one embodiment, the client interface 110 further interacts with the client 102 to select a card from the plurality of cards 106. The plurality of cards 106 includes cards having various, different pre-programmed features and the client selects a card based on the features of the card. In one embodiment, the plurality of cards 106 includes cards representing accounts having varying pre-defined amounts and the client 102 selects the card based on the pre-defined amount. For example, the kiosk 104 is specifically located with respect to a particular merchant (e.g., in the particular merchants store, in a store affiliated with the particular merchant) and the plurality of cards 106 comprises cards (e.g., a stack of gift cards or a memory area storing a plurality of virtual cards) issued by the particular (pre-determined) merchant. The cards have pre-defined balances indicating an amount redeemable by the cardholder with the one particular (pre-determined) merchant. The client interface 110 interacts with the client 102 to allow the client 102 to select a card having one of the pre-defined amounts. In another example, the plurality of cards 106 include cards issued by a credit association (e.g., American Express®) affiliate/merchant and similarly have various pre-defined amounts. Each of the plurality of cards 106 is redeemable with any merchant accepting the card issued by the credit association. The client interface 110 interacts with the client 102 to allow the client to select a card having a particular pre-defined amount. In another embodiment, each of the plurality of cards 106 additionally or alternatively has a pre-defined amount redeemable at varying one or more merchants and the client 102 selects a card from the plurality of cards 106 based on a particular merchant(s). For example, the kiosk 104 is specifically located with respect to a group of merchants (e.g., the kiosk 104 is located in a mall where the merchants of the group have stores) and the plurality of cards 106 includes cards (e.g., a stack of gift cards or a memory area storing a plurality of virtual cards) issued by each of the merchants of the group. Each card has a pre-defined balance indicating an amount redeemable with the merchant from the group who issued the card. The client interface 110 interacts with the client 102 to allow the client 102 to select the card issued from a particular merchant of the group and having a particular pre-defined balance.

According to one embodiment, the client interface 110 further interacts with the client 102 to select additional design data for including additional material in the card. For example, the selected design data may include one or more of the following: identifying information associated with the cardholder, a personalized message, identifying information associated with the client, contact information associated with the client 102, identifying information associated with the particular merchant, contact information associated with the particular merchant, credit redeemable by the cardholder, an expiration date for redeeming the credit. According to another embodiment, the client interface 110 further interacts with the client 102 to select design data for further customizing the appearance of the graphical material which is part of the card. The design data, for example, may include data for specifying one or more of the following: font of characters, style of characters, size of the information on the card, size of the display of the virtual card, position of the information on the front of the card, position of information on the back of the card, color of the information, a border for the card, a theme for the card, and an orientation of the information of the card. The design data for selecting and customizing material may be stored in the client interface 110 memory, the design database 108, and/or other storage media.

Figure 2A:
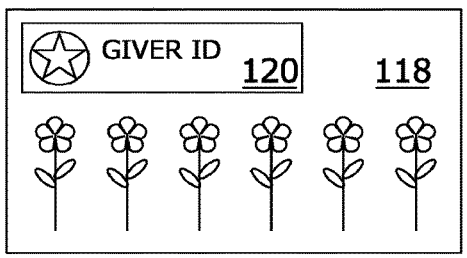
FIG. 2A is a top view of the front side of an exemplary physical or virtual card customized according to one embodiment of the invention.
Figure 2B:
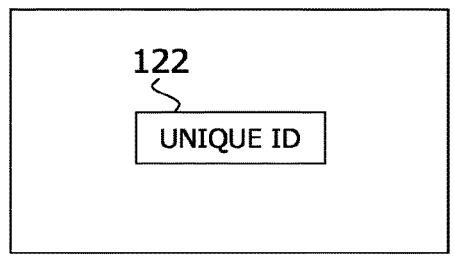
FIG. 2B is a top view of the back side of an exemplary physical or virtual card customized according to one embodiment of the invention.

FIGS. 2A and 2B illustrate an exemplary physical or virtual card, according to one embodiment of the present invention. FIG. 2A illustrates the front side of the exemplary card and FIG. 2B illustrates the back side of the exemplary card. The material on the front side of the card includes a selected card background 118 and a selected one or more logos 120 identifying the card giver (e.g., client 102) and/or the selected merchants. The illustration of the back side of the exemplary card indicates that an account identifier 122 may be included as part of the card to identify the account represented by the card. For example, the account identifier 122 included as part of the card may include numbers representing an account number which are formed in the material comprising the card (e.g., raised plastic in the shape of the numbers), an identifier as part of the card (e.g., numbers, letters, barcode), a magnetic stripe embedded in a physical card on which the card number is encoded, numbers representing an account number displayed on a virtual card, account information data stored in memory, and/or a radio-frequency identifier embedded in the card. In particular, the account identifier 122 comprises an account number which is used by the card issuer to manage the account. For example, a merchant issuing a gift card may map the account identifier to the pre-determined amount in order to authorize the redeeming of the amount in a transaction with a cardholder. In one embodiment, the plurality of cards 106 includes the account identifier prior to being customized. In another embodiment, the card creator 112 adds an account identifier 122 to the card being customized. For example, the card creator 112 may print numbers, letters, a barcode, and/or a magnetic stripe on a physical card for identifying the card or the card creator 112 may display numbers, letters, a barcode, and/or other indicia on a virtual card for identifying the card.

Figure 3:
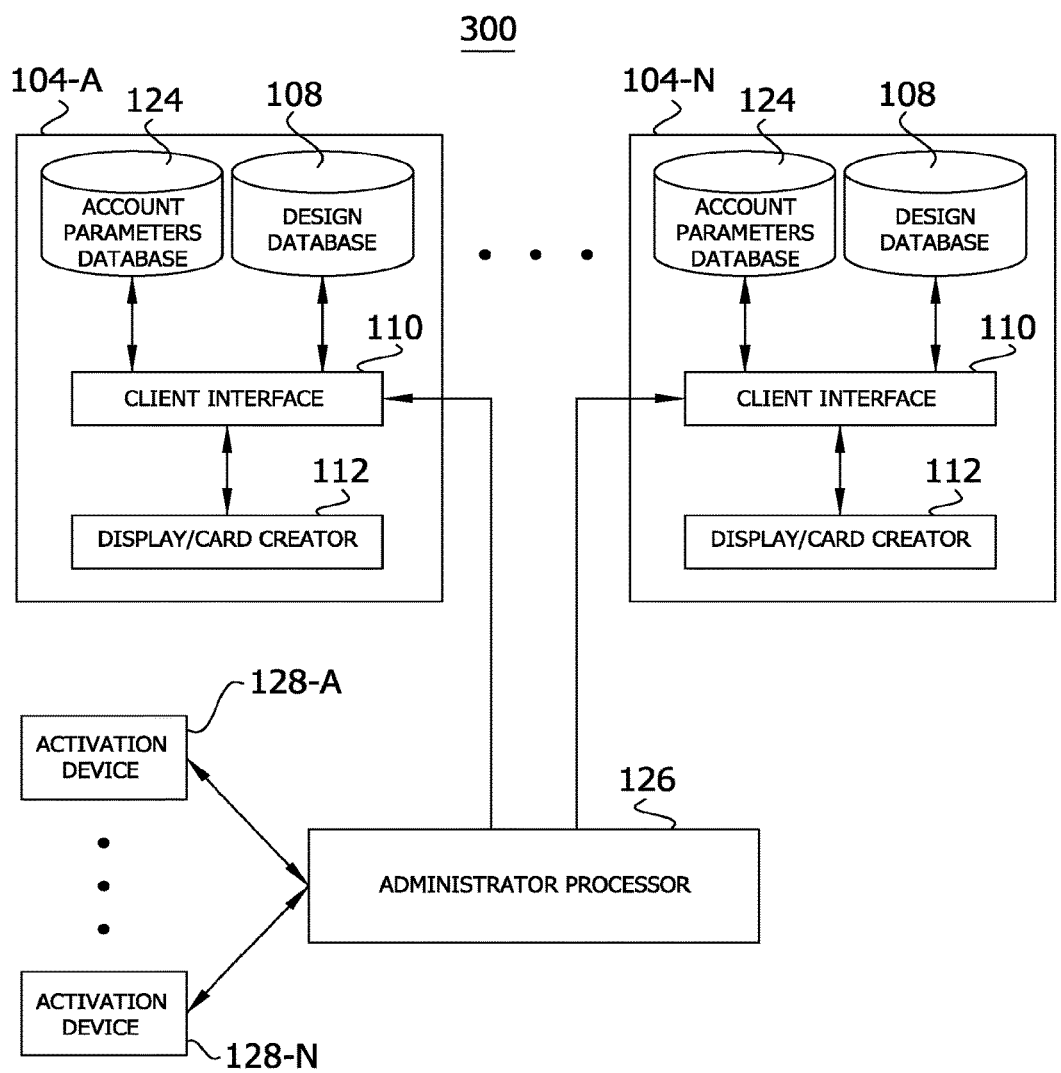
FIG. 3 is a block diagram illustrating a system for allowing a client to interactively create a customized physical or virtual card based on data stored locally with respect to the client, according to one embodiment of the invention.
Figure 4:
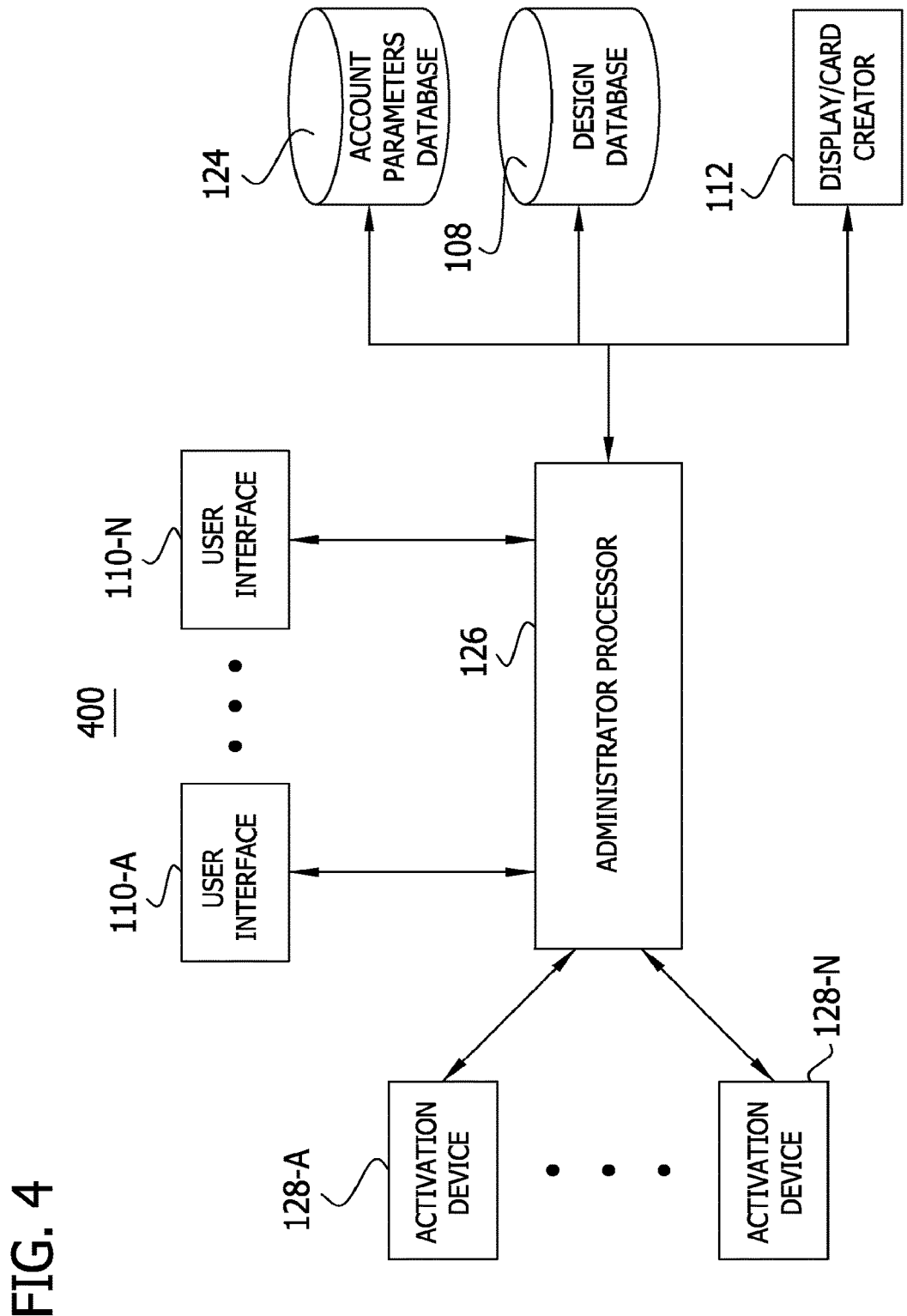
FIG. 4 is a block diagram illustrating a system for allowing a client to interactively create a customized physical or virtual card based on data stored remotely with respect to the client, according to one embodiment of the invention.

Referring to FIGS. 3 and 4, embodiments of the present invention further allow the client to specify account parameters (i.e., data) for the card. FIGS. 3 and 4 are block diagrams illustrating exemplary systems 300, 400 for creating a customized card according to account parameters and design data specified by the client 102. The illustrated systems 300, 400 include a client interface 110 connected to an administrator processor 126 via a wired (e.g., wired network or direct-wired connection) and/or a wireless (e.g., acoustic, radio frequency (RF), infrared) communication media. According to the illustrated systems 300, 400, the client interface 110 interacts with a client 102 to create a customized card and communicates information obtained from the client 102 to the administrator processor 126. The administrator processor 126 manages the account of the customized card based on the information received from the client interface 110. For example, the administrator processor 126 is controlled by an incentive company and the administrator processor 126 manages the accounts represented by the cards created by sponsoring employers for rewarding employees. A device, hereinafter referred to as an activation device 128, in communication with the administrator processor, communicates data to the administrator processor 126 to activate the card.

The system 300 illustrated in FIG. 3 includes one or more kiosks 104-A, 104-N housing a client interface 110 and an account parameters database 124 for storing one or more account parameters for accessing by the client interface 110. The client interface 110 accesses the account parameters database 124 to allow the client 102 to customize the account parameters for a card. In one embodiment, the account parameters database 124 stores information identifying a plurality of participating merchants (e.g., merchants agreeing to redeem balance amounts and/or extend credit). The client interface 110 accesses the account parameters database 124 to allow the client 102 to select one or more of the participating merchants from the account parameters database 124. In another embodiment, the account parameters database 124 alternatively or additionally stores value data defining available account balance amounts. The client interface 110 accesses the account parameters database 124 to allow the client 102 to indicate the account balance amount for the card. For example, the account parameters database 124 may store information identifying various pre-defined account balance amount which a particular participating merchant has agreed to redeem and the client 102 selects an available account balance via the client interface 110. In another example, the account parameters database 124 stores information indicating that the client 102 may specify a balance amount. According to one embodiment, the account parameters stored in the account parameters database 124 are controlled by the administrator processor 126 via the client interface 110. For example, the administrator processor 126 transmits data to the client interface 110 indicating the participating merchants for storing in the account parameters database 124.

In the illustrated system 300, the kiosks 104 further house a design database 108 and a card creator 112 connected to the client interface 110 for designing and dispensing customized cards, as previously described. In one embodiment, the administrator processor 126 transmits design data to the client interface 110 for storing in the design database 108 (e.g., background database 116, logo database 114). For example, the administrator processor 126 is controlled by an incentive company and the kiosk 104 is located at an employer sponsoring an incentive program. The design data transmitted by the administrator processor 126 may include card backgrounds associated with the particular incentive program and logos identifying the employer.

According to the illustrated system 300, the client interacts with the client interface 110 to select design data for graphical material to be part of the card and to select account parameters (e.g., to select an amount for which the card will be redeemable, and to select a merchant(s) with whom the amount will be redeemable). In one embodiment, the client interface 110 also identifies or generates an account identifier for identifying the account represented by the card. For example, the client interface 110 may generate a unique identifier (e.g., account number) and associate the unique identifier with the account. In another example, the client interface 110 identifies a pre-existing account identifier (e.g., an account identifier printed or otherwise included as part of the card before the card is customized). The client interface 110 then communicates data to the card creator 112 for dispensing the card. The data includes the selected design data. The data may also include a generated account identifier. Additionally, the data may include a client-specified number of cards for dispensing according to the design data. Responsive to receiving the data, the card creator 112 add graphic material to the(s) card according to the data. The card creator 112 then dispenses the card to the client 102. When the card is a physical card, the card is printed and delivered. When the card is a virtual card, the card is transmitted. The client interface 110 transmits the account parameters defining the account represented by the card to the administrator processor 126. In one embodiment, the account parameters include the account identifier identified or generated by the client interface 110. The administrator processor 126 receives and stores the account parameters for use in authorizing account transactions initiated by the cardholder.

The system 400 illustrated by FIG. 4 allows a client interface 110 to interact with a client to create a customized card based on account parameters and design data stored remote to the client interface 110 and communicated to the client interface 110 via the administrator processor 126. In particular, the administrator processor 126 accesses the account parameters database 124 and transmits account parameters to the client interface 110 for selecting by the client. The client interface 110 displays the account parameters (e.g., plurality of participating merchants, data for prompting the client to enter an amount for the card) to the client 102 and receives a response from the client 102 indicating selected account parameters (e.g., selected merchant, selected amount) for defining the account represented by the card. The administrator processor 126 receives and stores the account parameters for use by the card issuer in authorizing account transactions initiated by the cardholder. Additionally, the administrator processor 126 accesses the design database 108 and transmits design data to the client interface 110 for displaying to the client 102. The client interface 110 displays the design data to the client 102 and receives a response from the client indicating a selected design feature for the card (e.g., background, logo, personalized message, etc.). The client interface 110 transmits the selected design data (e.g., data indicating the selected design feature) to the administrator processor 126 for use as part of the card.

For example, the client interface 110 may be an employer's computing device running a web browser. The administrator processor 126 may be a server hosting a web application (e.g., web page, web site) controlled by an incentive company contracted by the employer. The employer 102 selects account parameters and design data from the web application by interacting with the computing device and web browser. The selections are received by the server. The server stores the account data for use in authorizing transactions initiated by the cardholder (e.g., the employee). The server transmits the design data to the card creator 112 for dispensing one or more cards based on the design data. The card(s) are distributed to the employer 102 (e.g., via mail, personal delivery, picked up by the employer 102).

According to the systems 300 and 400, the administrator processor 126 communicates with an activation device(s) 128-A, 128-N for activating or initiating the account. The activation device 128 may be any device in communication with the administrator processor 126, such as a processor connected to a communication network, a phone, or a fax machine. Although the activation device(s) 128-A, 128-N is shown separate from the kiosks 104-A, 104-N, the activation device(s) 128 may be housed in the kiosks 104 and/or integrated into the client interface 110. The activation device 128 transmits activation/initiating data to the administrator processor 126. For example, the activation device 128 may communicate funding information. For instance, as previously discussed a client may interact with a client interface 110, such as the client's computing device, to customize cards which are printed or transmitted remote to the client. In addition to transmitting the data for customizing the cards, the client's computing device may also be used to transmit data to initiate/activate the cards for a funded amount along with or subsequent to the transmission of the customizing data. Accordingly, the client can arrange to have the cards activated by the time the cards are distributed (e.g., mail, personal delivery, pick up) to the client. In another example, the activation device 128 may additionally or alternatively communicate a client status. The client's status may indicate one or more of the following: amount of card is redeemable as a function of immediate funding by the client, amount of card is redeemable as a function of subsequent funding by the client, amount of card is immediately redeemable, amount of card is redeemable after a certain time period, and amount of card is redeemable for a limited amount. For instance, the kiosk 104 may include a processor which comprises the client interface 110 and the activation device 128. A sales representative may interact with the client interface 110 to create a card for demonstrating the kiosk 104 to a current or perspective client. The processor communicates the data selected by the sales representative along with the client's status as a sales representative to the administrator processor 126. Based on the client's status as a sales representative, the administrator processor 126 activates the card for an amount within a pre-defined authorized level without requiring funding from the sales representative. In yet another example, the activation device 128 may additionally or alternatively communicate a code required by the issuer and/or administrator in order to use the card to make purchases.

Figure 5A:
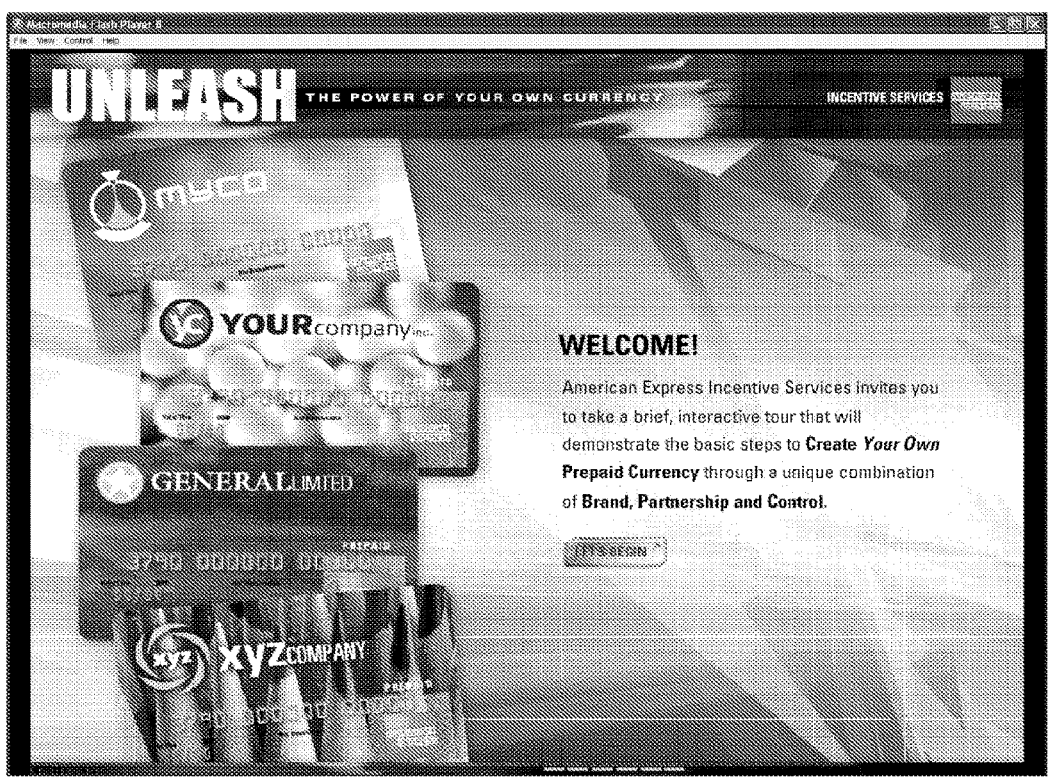
FIG. 5A-5Q are screenshots illustrating an exemplary process for creating a customized physical or virtual card from a client's perspective, according to one embodiment of the invention.
Figure 5B:
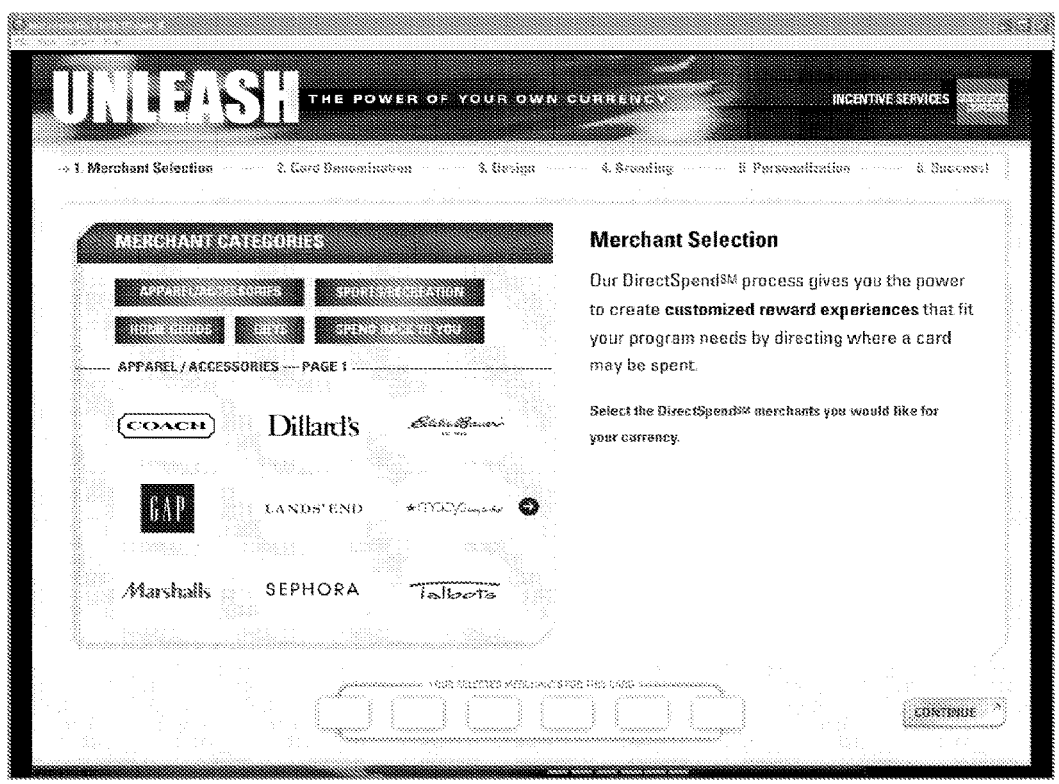
Figure 5C:
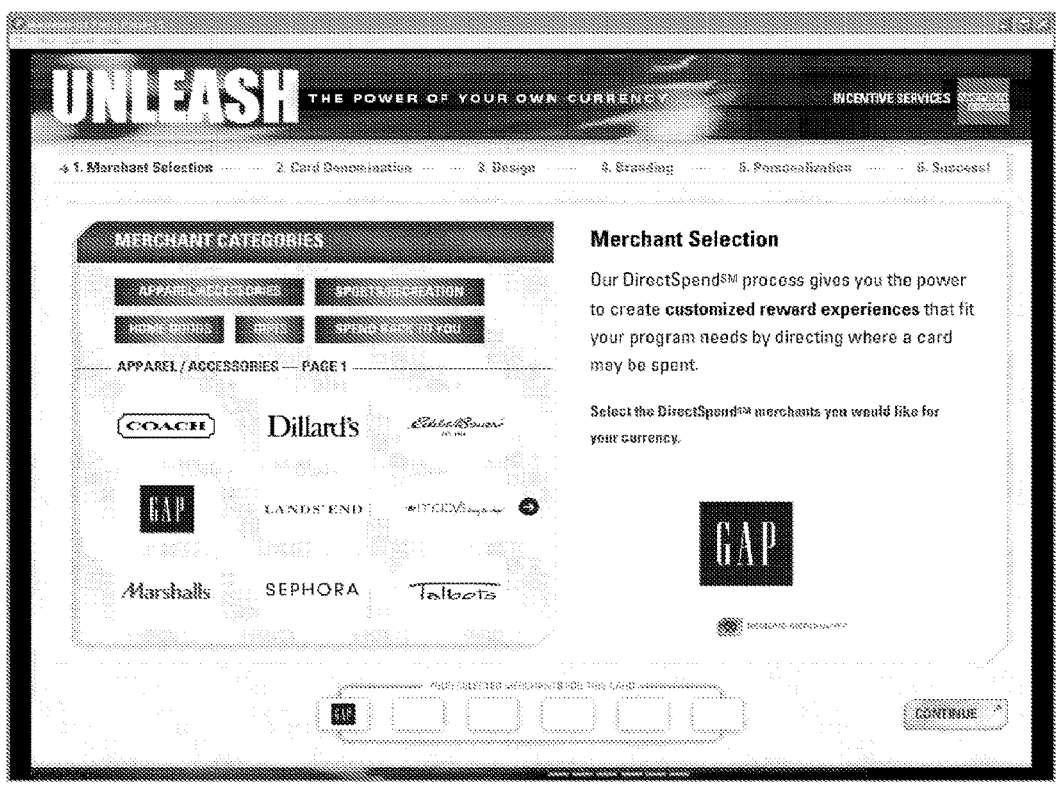
Figure 5D:
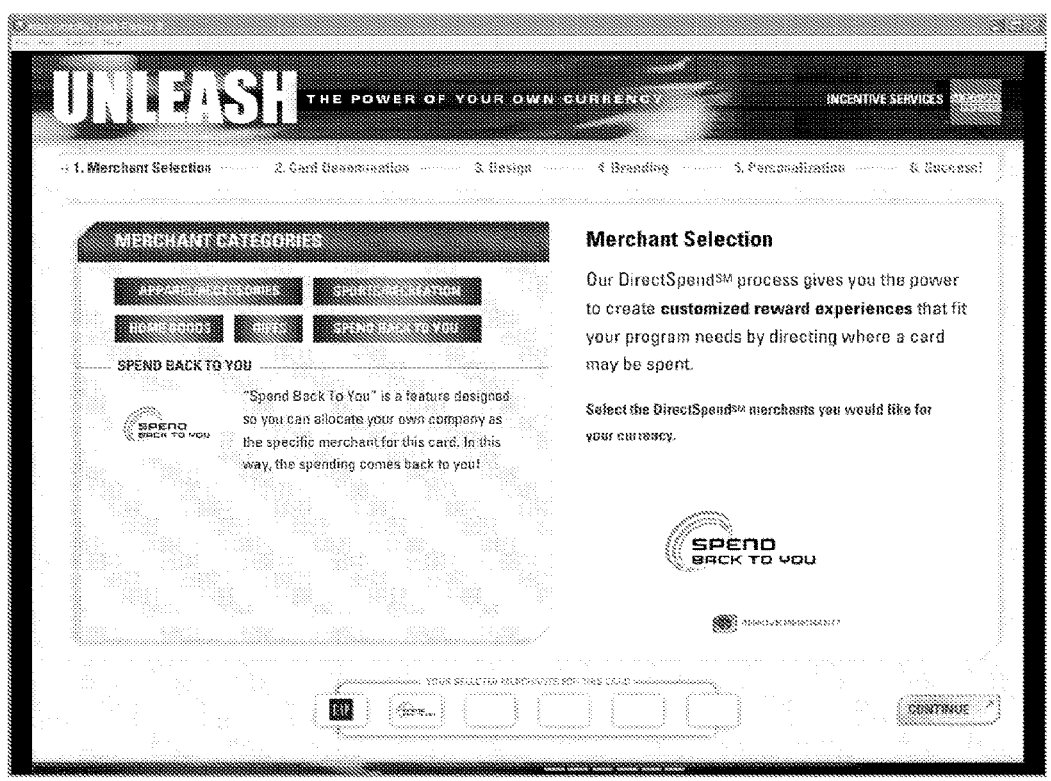
Figure 5E:
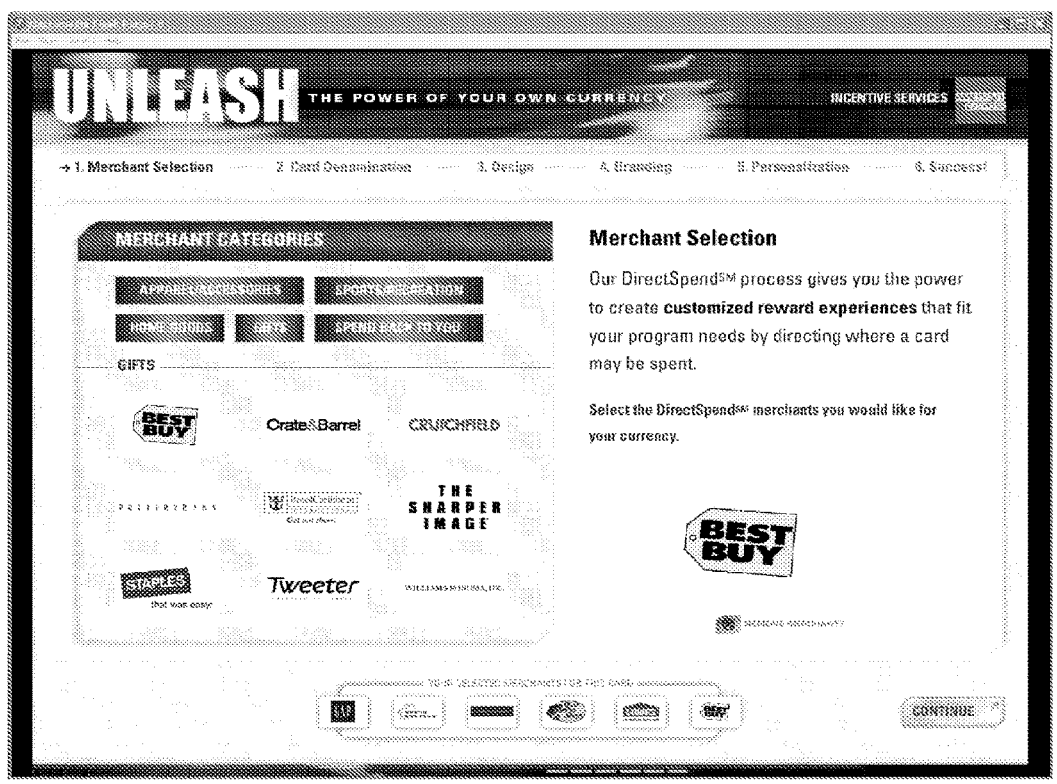
Figure 5F:
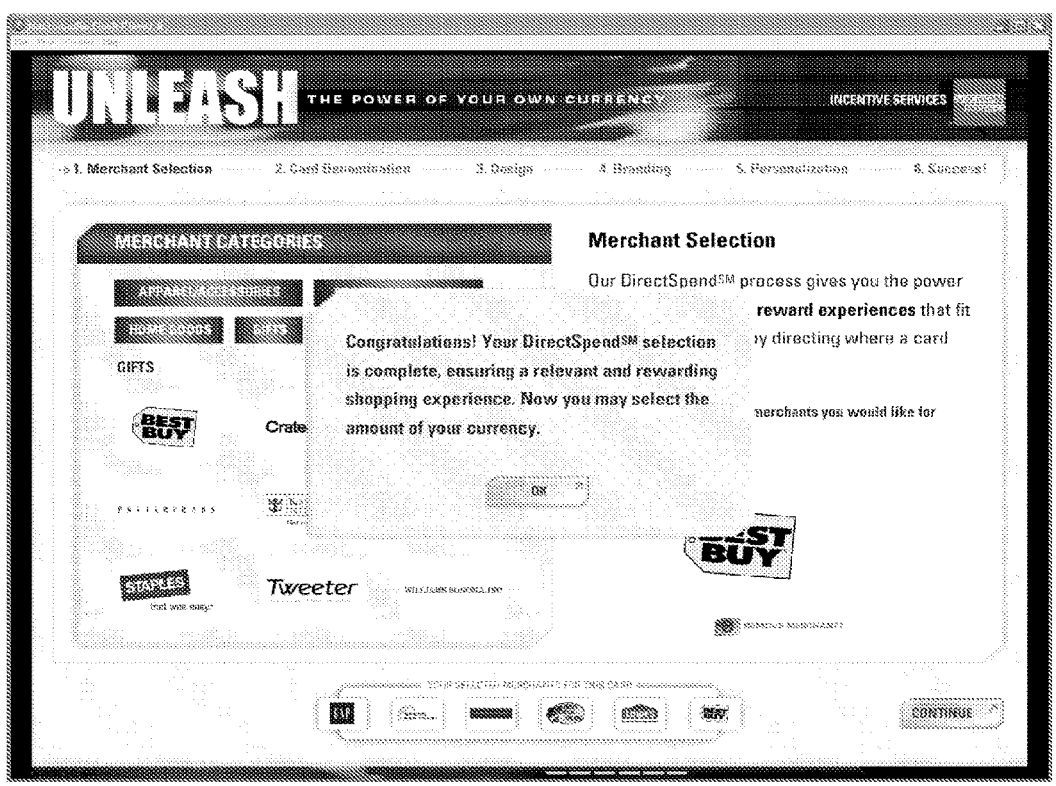
Figure 5G:
Figure 5H:
Figure 5I:
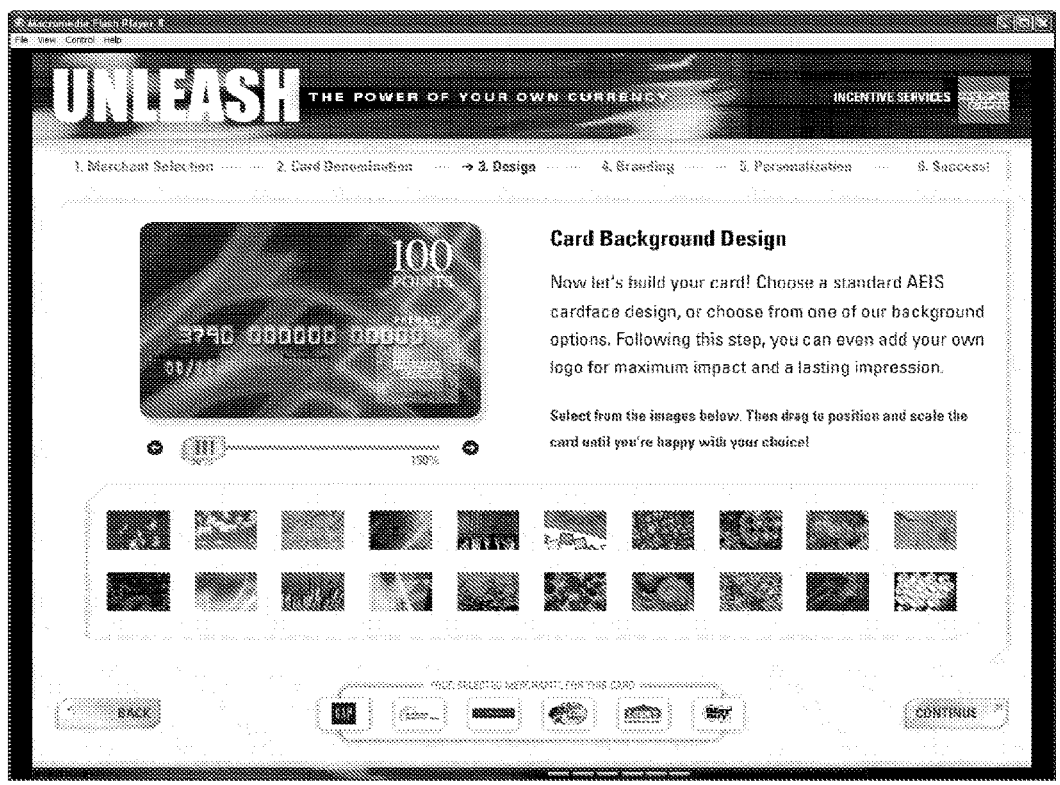
Figure 5J:
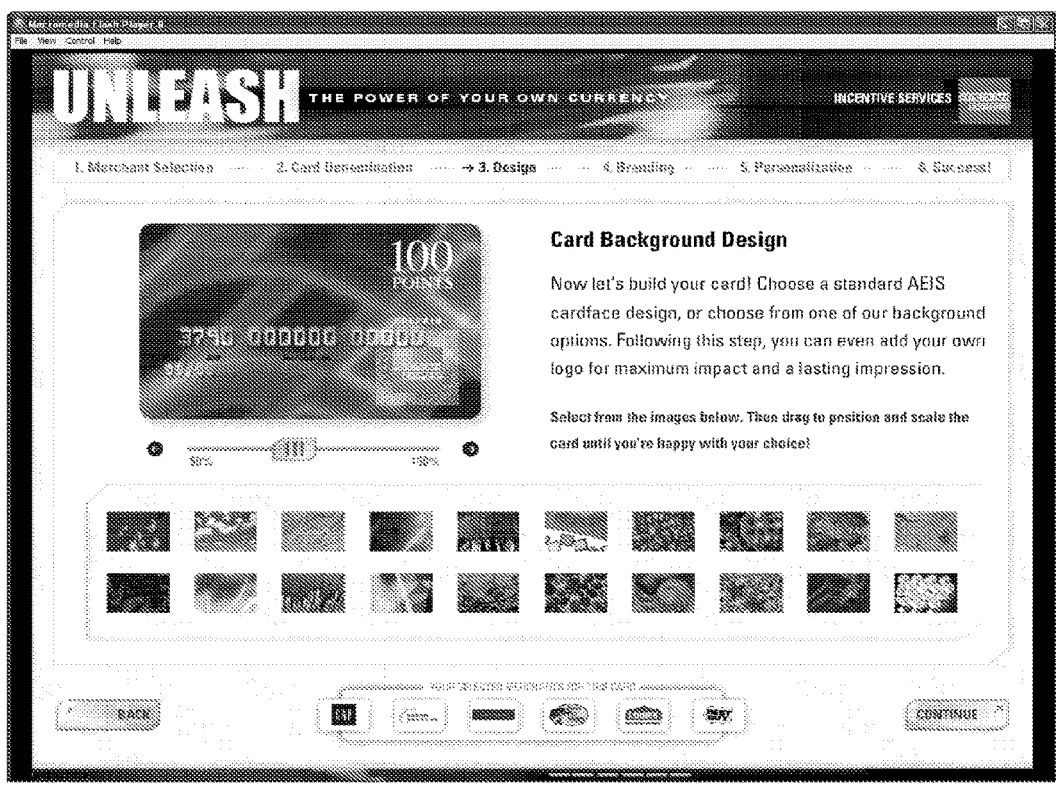
Figure 5K:
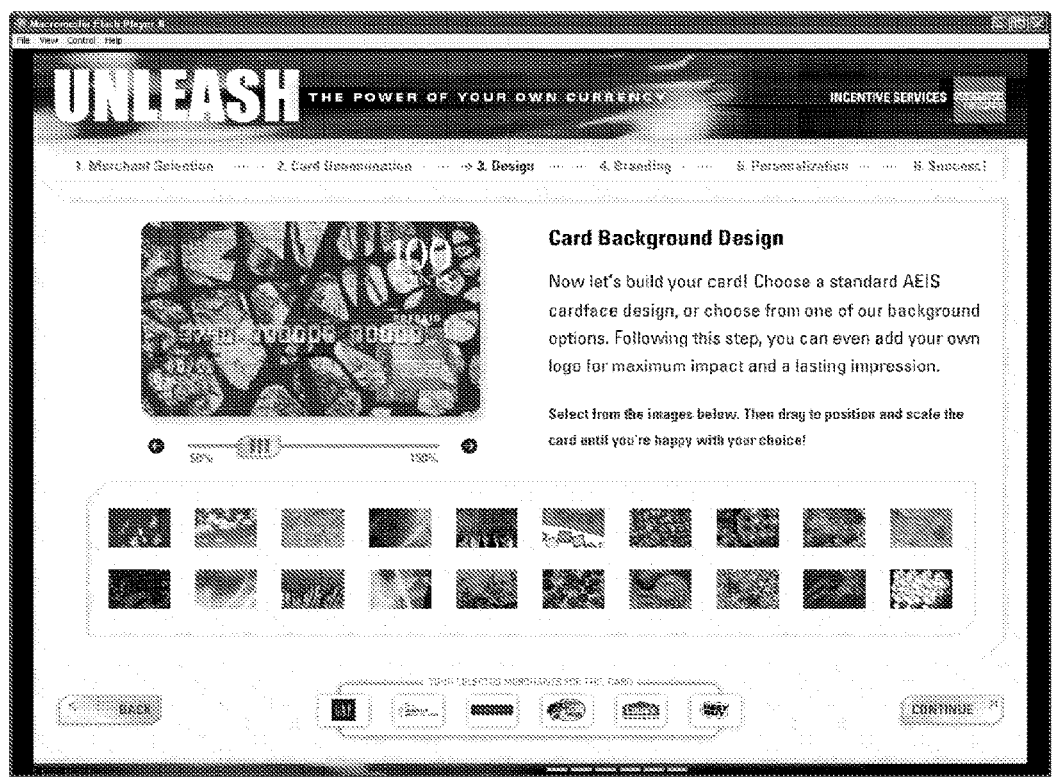
Figure 5L:
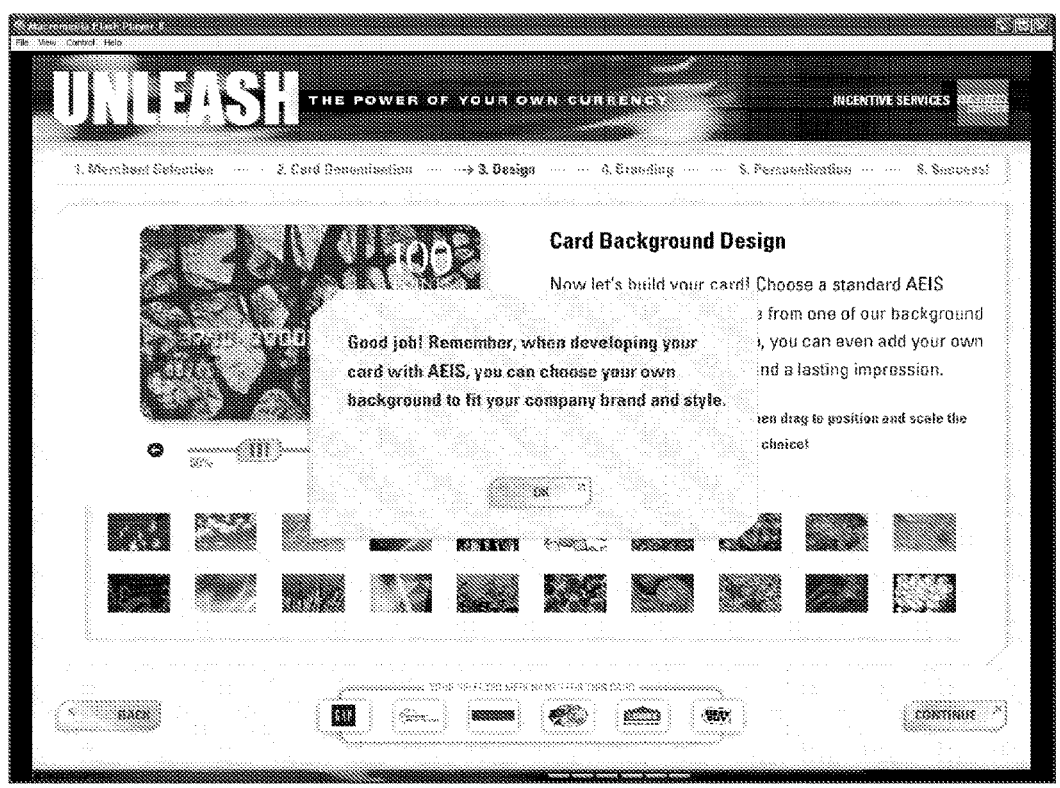
Figure 5M:
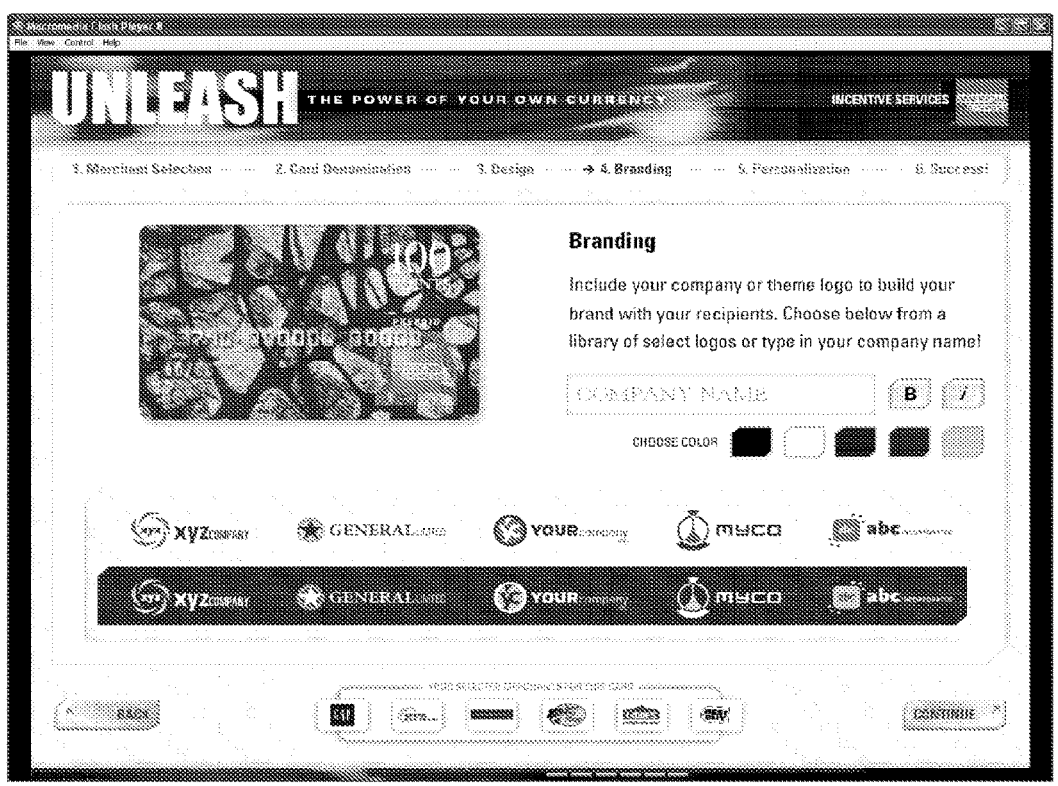
Figure 5N:
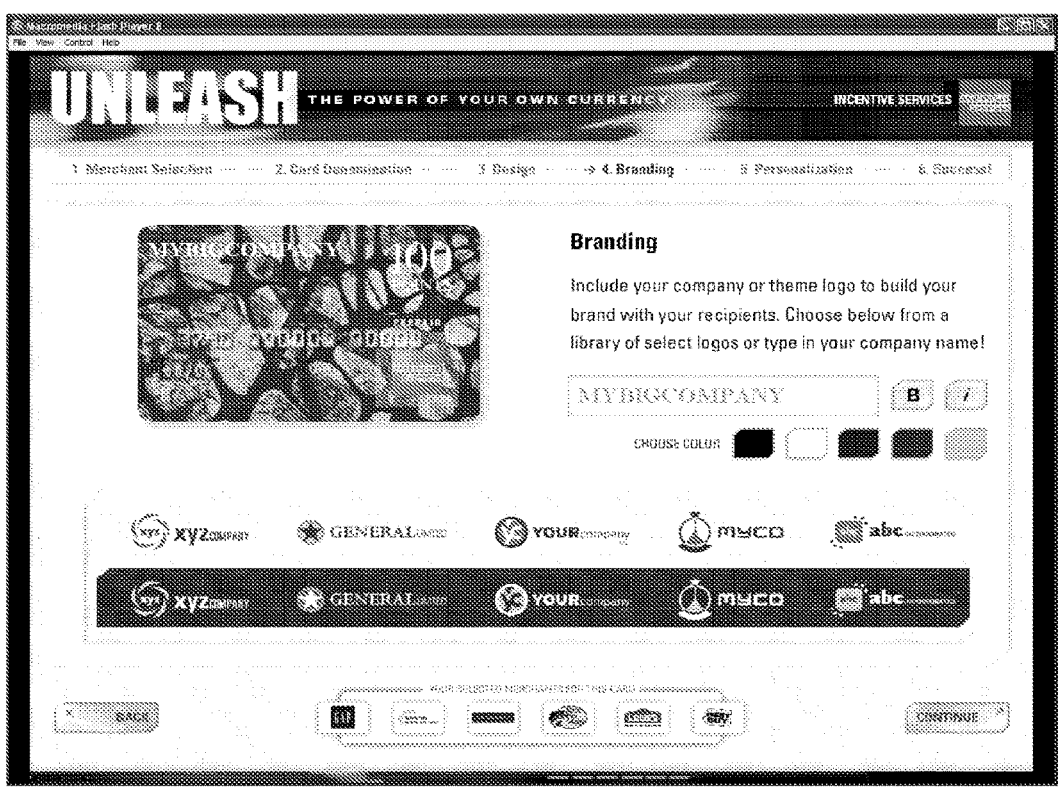
Figure 5O:
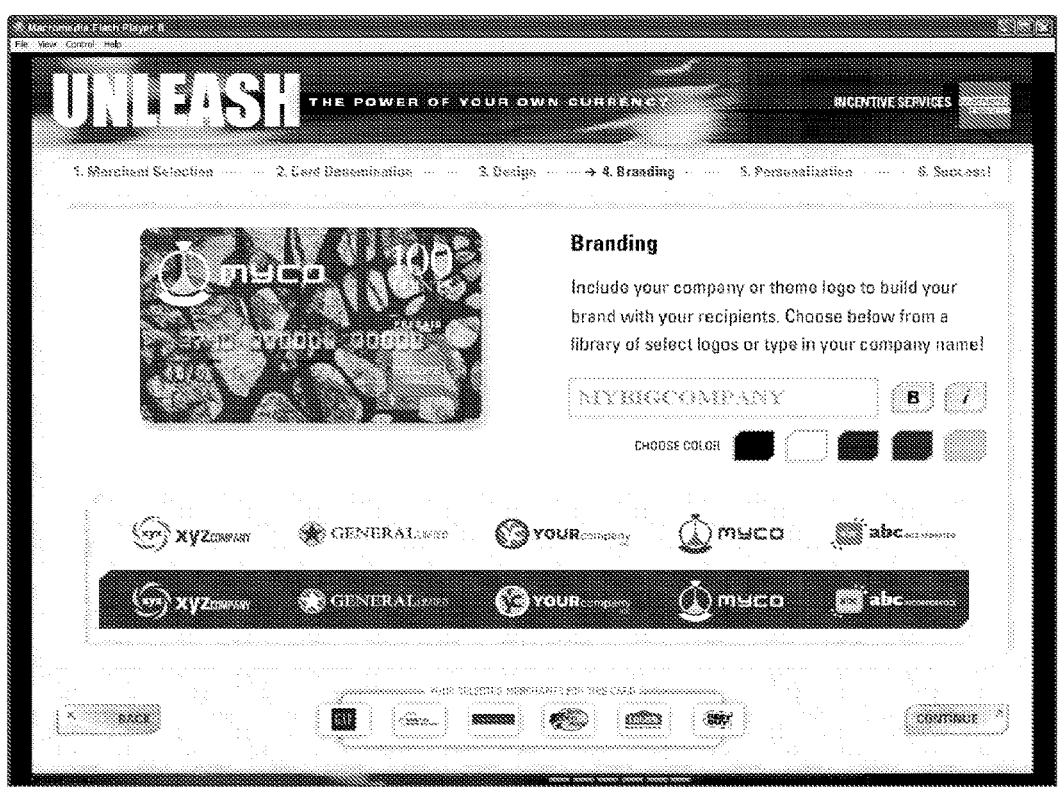
Figure 5P:
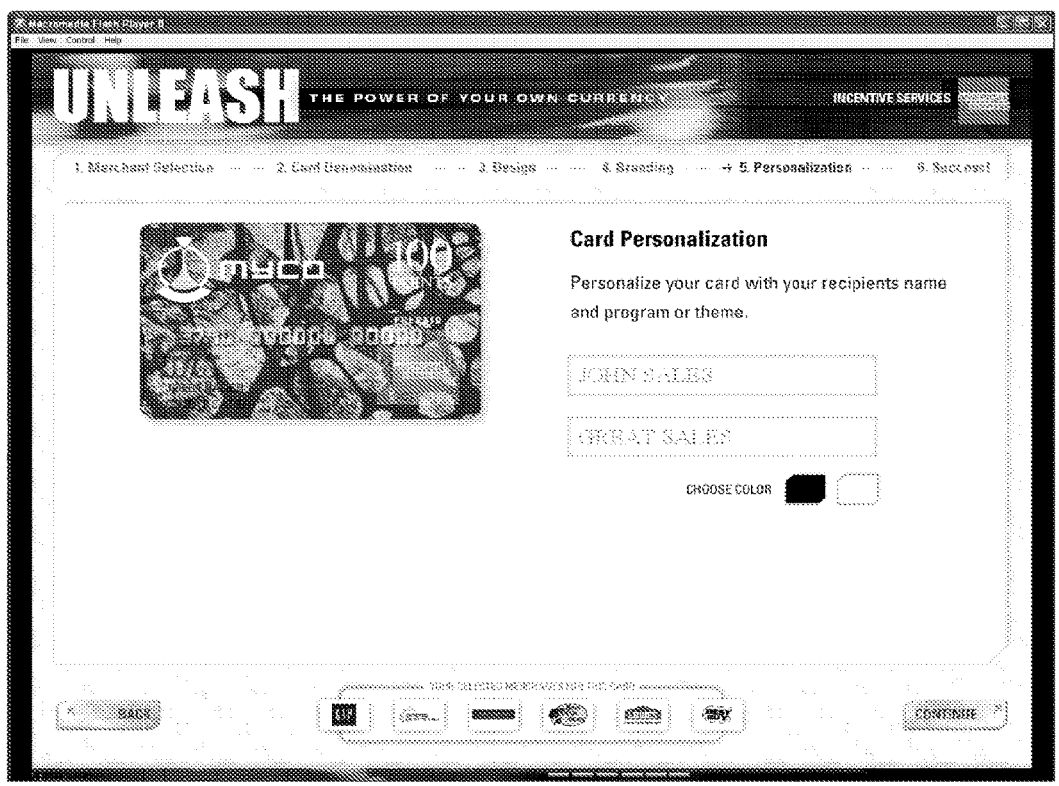
Figure 5Q:
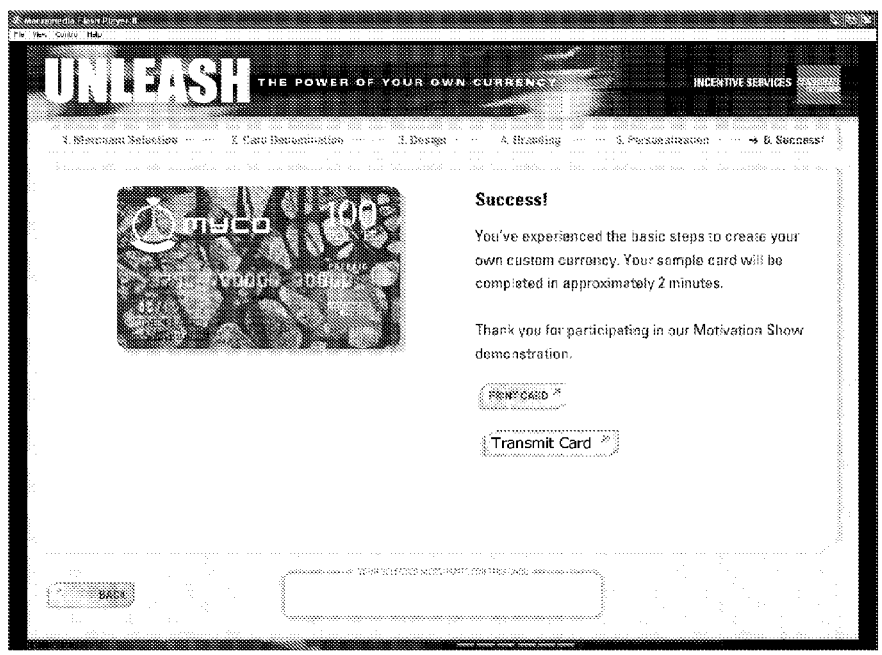

FIGS. 5A-5Q illustrates an exemplary process for creating a customized card from a client's perspective, according to an exemplary embodiment of the invention. In particular, the exemplary method illustrates a client's interaction with the client interface 110 to specify account parameters (e.g., merchants and amount) for the account represented by the card based on account parameters stored in an account parameters database 124 and design data (e.g., card background, client logo, personalized message) for the customizing the graphical material which is part of the card based on design data stored in a design database 108. The exemplary method is managed by an incentive company (e.g., American Express Incentives Services, Inc.) via an administrator processor 126 in communication with the client interface 110. The client interface 110 interacts with a client/card giver/sponsor (e.g., employer merchant) 102 to create the customized reward card which is issued by AEIS for redeeming by a cardholder with client-specified merchants. Referring to FIG. 5A, a welcome screen introduces the client to the method for creating the card. The screen indicates the issuer of the card (e.g., AEIS) and that the customized card will include data identifying the issuer (e.g., AEIS logo).

Referring to FIGS. 5B, 5C, 5D, 5E, and 5F, the client interface 110 accesses the merchant data stored in the account parameters database 124 and displays the merchant data (e.g., text, images, logos) identifying a plurality of participating merchants. The participating merchants are merchants agreeing to accept the card amount as currency. Each of the participating merchants is associated with a category based on the products (e.g., goods or services) sold by the merchant. In the example illustrated by FIG. 5B, Coach®, Dillard's®, Eddie Bauer®, Gap®, Lands' End®, Macys'®, Marshalls®, Sephora®, and Talbots® are associated with the "Apparel/Accessories" category because they sell apparel and/or accessories. In FIG. 5C, Gap® is selected as a merchant. Referring to FIG. 5D, at least one of the categories (e.g., "spend back to you") may be customized to the goods or services sold by the client/card giver/sponsor (e.g., employer merchant) or a merchant affiliated with the client/card giver/sponsor. For example, a particular appliance manufacturer may be the sponsor employer and the retail merchants selling the appliances are associated with the "spend back to you category." In FIG. 5E, Best Buy® is illustrated as the "spend back to you" merchant.

The categories of merchants (e.g., Apparel/Accessories, Sports/Recreation, Home Goods, Gifts, Spend Back to You) are displayed to the client 102 via the client interface 110 and the client 102 responds via the client interface 110 to indicate a selected category. When the client interface 110 receives the response from the client 102 indicating the selected category, the client interface 110 displays merchant identifying data for the merchants associated with the selected category. The client 102 may select between one and six merchants (or more) for a particular card from the various categories. The selected merchants are the exclusive merchants with whom a transaction using the card will be authorized. The client 102 selects a merchant (e.g., Best Buy) by responding (e.g., touching the Best Buy) to the displayed merchants via the client interface 110. The client interface 110 receives the response and displays the selected merchant to the client 102. The client interface 110 may also be used by the client 102 to un-select the merchant. In an embodiment (not illustrated) information identifying the selected merchants may appear as part of the card (e.g., logos of the selected merchants). Referring to FIG. 5F, the client 102 indicates via the client interface 110 when the client 102 has completed the merchant selection.

Referring to FIGS. 5G and 5H, responsive to the client interface 110 receiving an indication that the client has completed the merchant selection, the client interface 110 displays value data for allowing the client 102 to select the amount for the balance of the card via the client interface 110. The amount may be a currency amount ($25, $50, $100) or a product amount (e.g., 1 DVD player model no. XYZ). The client interface 110 may additionally or alternatively display an option to select a card which has a zero balance (e.g., "none") and may be subsequently loaded (e.g., "reloadable"). The client 102 selects a particular pre-defined amount via the client interface 110 and receives value data responsive to the client 102 selecting a particular displayed amount via the client interface 110. In another embodiment (not illustrated), the client interface 110 prompts the client 102 to enter/specify an amount via the client interface 110 and responsive to the client entering a particular amount, receives value data indicating the entered/specified amount. The selected amount of the card may appear as part of the card. Referring to FIG. 5H, the client indicates via the client interface 110 when the client 102 has completed the amount selection.

Referring to FIGS. 5I, 5J, 5K, and 5L, responsive to the client interface 110 receiving an indication that the client 102 has completed the amount selection, the client interface 110 accesses stored card backgrounds from the design database 108 and displays the plurality of card backgrounds to the client 102. The client interface 110 receives design data from the client 102 indicating a selected card background from the displayed card backgrounds. The client interface 110 receives additional design data from the client for customizing the appearance of the selected background of the card. For example, the client 102 can drag the background to a particular position on the card and adjust the scale of the background with respect to the card. Based on the design data received by the client interface 110, the client interface 110 displays a preview of the card according to the selected design data and allows the client 102 to change the selections until the client 102 indicates that the selections are final (e.g., requests the card is printed or transmitted). Referring to FIG. 5L, the client indicates via the client interface 110 when the client 102 has completed the card background selection.

Referring to FIGS. 5M, 5N, and 5O, responsive to the client interface 110 receiving an indication from the client 102 that the client has completed the card background selection, the client interface 110 accesses the stored logos from the design database 108 and displays the plurality of logos to the client 102 (e.g., xyz company logo, general limited logo, your company logo, myco logo, abc incorporated logo). The client interface 110 receives from the client 102 via the client interface 110 a selected logo from the displayed logo. Alternatively, the client may provide a logo representing the client (e.g., the employer merchant) for use on the card. The client 102 provides the logo via the client interface 110 using text to enter the employer merchant's name and selecting additional design data for customizing the appearance of the entered text. For example, the client 102 may enter the text "MY BIG COMPANY" and select a font style (e.g., bold, italics) and a font color (e.g., black, white, blue, red, yellow) for the text. The client interface 110 displays a preview of the card according to the selected design data and allows the client 102 to change the selections until the client 102 indicates that the selections are final (e.g., requests that the card be printed or transmitted). Referring to FIG. 5O, the client indicates via the client interface 110 when the client 102 has completed the logo selection.

Referring to FIG. 5P, responsive to the client interface 110 receiving an indication that the client 102 has completed the logo selection, the client interface 110 prompts the client 102 to provide a personalized message. The client 102 provides the message via the client interface 110 using text to enter the message. For example, the text may include the prospective recipient cardholder's name (e.g., "John Sales"). In another example, the text additionally or alternatively describes the employer's incentive program or theme (e.g., "great sales"). The client 102 may select via the client interface 110 additional design data for customizing the appearance of the entered company. For example, the client 102 may select the color of the text (e.g., black, white). The client interface 110 displays a preview of the card according to the selected design data and allows the client 102 to change the selections until the client 102 indicates that the selections are final (e.g., requests that the card be printed or transmitted). The client 102 indicates via the client interface 110 when the client 102 has completed the personalized message customization.

Referring to FIG. 5Q, responsive to the client interface 110 receiving an indication that the client 102 has completed the personalized message customization, the client interface 110 prompts the client 102 to finalize the creation of the card by the selecting that the card be printed (or, in the case of a virtual card, selecting that the card by transmitted). In one embodiment (not illustrated), the client 102 can specify via the client interface 110 that a number of cards having the selected account parameters and design data be printed or transmitted. Responsive to the client 102 selecting the printing or transmitting of the card via the client interface 110, the client interface 110 communicates the account parameters for the card to the administrator processor 126. The account parameters include the selected account parameters (e.g., selected merchants and selected amount) and an account identifier. For example, the account identifier is the set of numbers appearing on the front of the card. Additionally, the client interface 110 communicates the selected design data to the card creator 112 for printing or transmitting the card according to the selected design data. The administrator processor 126, controlled by the incentive company (e.g., AEIS), manages the account parameters for use in authorizing transactions by the cardholder with the selected merchants.

Figure 6:
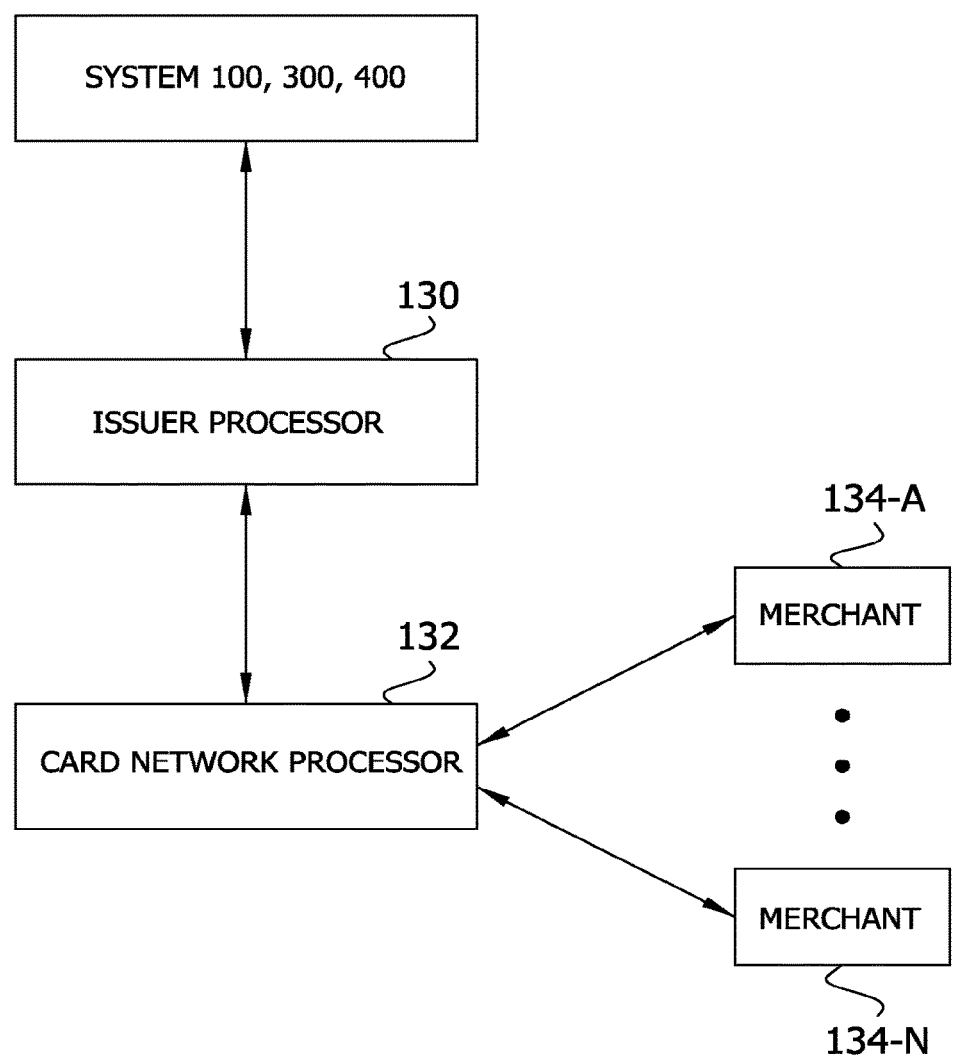
FIG. 6 is a block diagram illustrating an exemplary environment for redeeming an amount from the balance of the customized physical or virtual card in response to a client initiating a transaction with a merchant using the customized physical or virtual card, according to one embodiment of the invention.

FIG. 6 is a block diagram illustrating an environment for redeeming an amount from the balance of a card customized by a client according to the system 100, 300, and/or 400 which includes an administrator processor 126 for administering the account parameters. According to the illustrated embodiment, when a cardholder initiates a transaction with a merchant 134-A, 134-N using the card, the merchant 134-A, 134-N communicates a transaction request to a card processor 132. The transaction request includes the amount requested for redeeming by the cardholder, the identity of the requesting merchant 134-A, 134-N, and the identity of the account represented by the card. In one embodiment, the card processor 132 is controlled by a credit association. For example, the card processor 132 is supplied and controlled by a well-known commercial credit association such as the American Express® credit card network. In another embodiment, the card processor 132 is additionally or alternatively affiliated with the card issuer. The merchant 134-A, 134-N accesses the card processor 132 by a card reader, call-in access, web-based access, or any other access known to those skilled in the art.

In the illustrated environment, the card processor 132 is connected to an issuer processor 130 via a wired (e.g., wired network or direct-wired connection) and/or a wireless (e.g., acoustic, radio frequency (RF), infrared) communication media. Likewise, the issuer processor 130 is connected to the administrator processor 126 of the system 100, 300, 400 via a wired (e.g., wired network or direct-wired connection) and/or a wireless (e.g., acoustic, radio frequency (RF), infrared) communication media. The issuer processor 130 is controlled by the card issuer and configured to access the stored account parameters to evaluate (validate, authorize, approve, grant) the transaction request. In operation, the card processor 132 transmits the transaction request to the issuer processor 130 in response to receiving the request. The issuer processor 130 accesses the administrator processor 126 to obtain the account parameters for the account represented by the card identified in the transaction request. The issuer processor 130 then evaluates the transaction request based on the obtained account parameters. In particular, the issuer processor 130 compares the requesting merchant 134-A, 134-N to the selected merchant(s) indicated by the account parameters. Additionally, the issuer processor 130 compares the amount requested for redeeming to the redeemable amount indicated by the account parameters. The issuer processor 130 then transmits data to the card processor validating the requested transaction as a function of the requesting merchant 134-A, 134-N matching one of the selected merchant(s) and the amount requested for redeeming being less than or equal to the redeemable amount. Accordingly, the transaction request is validated in a transaction with a selected merchant for an amount less than or equal to the balance amount of the card. Otherwise, the transaction is denied.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," an "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for creating a customized stored value card for a client and processing and completing a first card transaction between a card user and a first participating merchant, wherein the client is not the card user, wherein the first participating merchant is also one of a plurality of client-selected merchants and for disapproving a second card transaction between the card user and a second participating merchant, and wherein the second participating merchant is not one of the plurality of client-selected merchants, said system comprising:
   a plurality of inactive accounts;
   a merchant database, comprising storage media, for storing information regarding a plurality of participating merchants, wherein the plurality of participating merchants are participating to accept the plurality of inactive accounts in a card transaction after such plurality of inactive accounts are activated and transformed into customized stored value cards, wherein the customized stored value cards are physical cards, and virtual cards, the customized stored value cards representing accounts between cardholders and the plurality of client-selected merchants, wherein a unique account number associates the card user with the client-selected merchants;
   a client interface for interacting with a client and customizing stored value cards based on input from the client comprising a memory for storing instructions and a processor for executing the stored instructions, the client interface connected to the merchant database, the stored instructions causing said client interface to interact with and to respond to said instructions by selecting a subset of the plurality of participating merchants, the subset of the plurality of participating merchants comprising the plurality of client-selected merchants, and selecting one of the accounts which will be accepted by the subset of the plurality of participating merchants after such account is activated and which will be rejected by a remainder of the plurality of participating merchants not comprising the subset of the plurality of participating merchants, the stored instructions causing said client interface to communicate the subset of the plurality of participating merchants to an administrator processor via a card network provider for determining whether a merchant at a point of sale comprises the subset of the plurality of participating merchants, wherein said card network provider is at least one of a credit card association and a debit card association;
   a card creator, comprising a processor, responsive to a communication from the client interface, said card creator associating an assigned account number with a designated card, wherein the assigned account number is the unique account number, wherein the card creator creates a customized physical card, and a customized virtual card from the assigned account number and designated card, and wherein the first card transaction involving the assigned account number and one of the plurality of client-selected merchants will be approved by a card network provider based on the communicated information identifying the assigned account number and the communicated information identifying the one of the plurality of client-selected merchants, and wherein the second card transaction involving the assigned account number and the remainder of the plurality of participating merchants not comprising the subset of the plurality of participating merchants will be disapproved by the card network provider based on the communicated information identifying the assigned account number and the communicated information identifying the one of the plurality of client-selected merchants; wherein the card creator is configured to create and dispense the customized physical card and the customized virtual card, and wherein the card creator creates the customized physical card, and the customized virtual card based on received client input and dispenses the customized physical card, and the customized virtual card to the client for use by the card user, wherein when the customized virtual card is dispensed, the customized virtual card is provided as a graphical display on a user's device, the graphical display having the same appearance the customized physical card.

2. The system of claim 1 wherein each of the plurality of inactive accounts which has been activated is associated with a pre-defined amount for redeeming only with the subset of the plurality of participating merchants.

3. The system of claim 1 wherein the plurality of client-selected merchants are individually selected or are one or more preset merchant groups selected via the client interface or a combination of merchants individually selected via the client interface and one or more preset merchant groups selected via the client interface, wherein each merchant group includes more than one merchant but less than all merchants accepting transactions via the card network provider.

4. The system of claim 1 further comprising graphical material associated with one of the plurality of inactive accounts wherein the graphical material includes additional material selected by the client via the client interface, said selected material includes one or more of the following: identifying information associated with a cardholder, a personalized message, identifying information associated with the client, contact information associated with the client, identifying information associated with the plurality of client-selected merchants, contact information associated with the plurality of client-selected merchants, credit redeemable by the card user, and an expiration date for redeeming the credit.

5. The system of claim 1 further comprising a kiosk housing the client interface.

6. The system of claim 1 wherein the client interface interacts with the client to receive design data for further customizing the appearance of material associated with one of the plurality of inactive accounts, said customizing data including one or more of the following: font of characters, style of characters, size of the material associated with the account, color of the information, a theme associated with the account, and an orientation of the material associated with the account.

7. The system of claim 1 wherein a selected logo associated with the client and provided via the client interface is stored in a logo database and is printed on the customized physical card.

8. The system of claim 1 wherein the client comprises a business which owns a merchant or merchants, a cardholder, a sponsor, a card giver, or a card recipient.

9. The method of claim 1 wherein the comprises a business which owns a merchant or merchants, a cardholder, a sponsor, a card giver, or a card recipient.

10. A system comprising:
  a processor comprising computer executable instructions, which, in response to input from a client for activating an inactive account representative of a stored value card for a card user, wherein the client is not the card user, the processor, modified by the computer executable instructions, is configured to activate the inactive account representative of the card and create a customized physical card and a customized virtual card for the client, the customized physical card, and the customized virtual card representing an account between the card user and a first number of merchants which are authorized for the account, the customized physical card, and the customized virtual card usable only at the first number of merchants, wherein said computer executable instructions further cause the processor to assign a unique account number to the customized physical card, and the customized virtual card wherein the unique account number associates the card user and a second number of merchants, and to dispense the customized physical card, and the customized virtual card to for use by the card user, wherein when the customized virtual card is dispensed, the customized virtual card is provided as a graphical display on a card user's device, the graphical display having the same appearance the customized physical card;
  a merchant management system with merchant information related to the first number of merchants, wherein the merchant management system comprises computer executable instructions which cause the merchant management system to create a filter corresponding to the customized physical card, and the customized virtual card related to the second number of merchants, wherein the second number of merchants is a subset of the first number of merchants, and wherein the second number of merchants are selected by the client from the first number of merchants;
  a card processing system operated by at least one of a credit card association and a debit card association, wherein the card processing system comprises computer executable instruction which cause the card processing system to receive from a merchant a transaction request to redeem the customized physical card, and the customized virtual card, to obtain confirmation via the merchant management system responsive to the transaction request that the merchant is one of the second number of merchants, to authorize use of the customized physical card, and the customized virtual card at the merchant only when confirmation is obtained that the merchant is one of the second number of merchants, and to deny use of the customized physical card, and the customized virtual card, or both at the merchant when the confirmation is not obtained.

11. The system of claim 10 wherein the client comprises a business which owns a merchant or merchants, a cardholder, a sponsor, a card giver, or a card recipient.

12. A system for creating a customized stored value card for a client and approving a transaction for processing the customized stored value card comprising:
  an account between a card holder and a plurality of client-selected merchants, wherein the client is not the card user, wherein the plurality of client-selected merchants is a subset of a plurality of participating merchants authorized for the account, wherein said account is activated and transformed into a stored value card by a card creator of the system, wherein the stored value card is a customized physical card, and a customized virtual card and wherein the card creator dispenses the customized physical card, and the customized virtual card for use by the card user only with the subset of the plurality of participating merchants, wherein when the customized virtual card is dispensed, the customized virtual card is provided as a graphical display on a card user's device, the graphical display having the same appearance the customized physical card;
  an account parameters database, comprising storage media, storing information identifying the plurality of participating merchants; and
  a client interface which interacts with the client and which includes a non-transitory computer readable memory for storing instructions and a processor for executing the stored instructions, the client interface connected to the account parameters database, the stored instructions causing said client interface to select merchants from the plurality of participating merchants identified by the information stored in the account parameters database, wherein the client interface is enabled to select a number of merchants less than all of the plurality of participating merchants using a card network provider, said client interface including:
(i) an input component for receiving, merchant selection from the client, information consisting of the plurality of client-selected merchants,
(ii) an output component for transmitting the client-selected merchants and account number information to an administrative processor, wherein the account number is a unique account number and the unique account number associates the card user and the plurality of client-selected merchants; and
(iii) an administrator processor for communicating data for transforming the account from an unactivated state to an activated state.

13. The system of claim 12 wherein the client interface interacts with the client to select an amount redeemable by the card user, said selected amount being redeemable by the card user at the plurality of client-selected merchants and not redeemable at a remainder of the plurality of participating merchants not comprising the subset of a plurality of participating merchants.

14. The system of claim 12 further comprising a kiosk unit housing the client interface.

15. The system of claim 12 wherein the client interface interacts with the client to display a preview of the customized physical card, the customized virtual card, or both to the client before the card creator activates the customized physical card, the customized virtual card, or both.

16. The system of claim 12 wherein the client interface further interacts with the client to collect an image provided by the client.

17. The system of claim 13 wherein the amount includes one or more of the following: an amount corresponding to a particular product sold by at least one of the plurality of client-selected merchants, an amount corresponding to a particular service sold by at least one of the plurality of client-selected merchants, an amount corresponding to a denomination redeemable for products or services sold by at least one of the plurality of client-selected merchants, a zero balance subsequently loadable with an amount, and zero balance unloadable with an additional amount.

18. The system of claim 12 wherein a selected logo associated with the client and provided via the client interface is stored in a logo database and is printed on the customized physical card.

19. The system of claim 12 wherein the client comprises a business which owns a merchant or merchants, a cardholder, a sponsor, a card giver, or a card recipient.

20. A computer implemented method for creating a customized stored value card for a client and approving a card transaction relating to an account between a card user and a plurality of client- selected merchants, wherein the client is not the card user, wherein the plurality of client-selected merchants is a subset of a plurality of participating merchants authorized for the account, wherein the account is represented by a customized physical card, and a customized virtual card wherein a card creator is configured to create the customized physical card and the customized virtual card, wherein a unique account number associates the card user, the customized physical card, and the customized virtual card and the plurality of client- selected merchants, and wherein the card creator is configured to dispense the customized physical card, and the customized virtual card for use through a card network provider by the card user, wherein when the customized virtual card is dispensed, the customized virtual card is provided as a graphical display on a card user's device, the graphical display having the same appearance the customized physical card, said method performed by a client interface comprising stored instructions in a memory, which, when executed by the client interface's processor, cause the client interface to perform the method comprising:
receiving merchant data, said merchant data identifying merchants selected by the client from the plurality of participating merchants;
receiving value data, said value data indicating an amount selected by the client to be added to the account represented by the customized physical card, and the customized virtual card facilitating the transformation of the customized physical card, and the customized virtual card from an unactivated state to an activated state, said amount redeemable by the card user with the plurality of client-selected merchants as a function of the client funding said amount;
providing access to account parameters through the card network provider for authorizing a transaction with a first merchant for the account based on said account parameters, wherein said card network provider is at least one of a credit card association and a debit card association, said account parameters including the merchant data and value data, said authorizing including determining that the first merchant requesting the transaction is a selected merchant based on the merchant data; and
providing access to account parameters through the card network provider for denying a transaction with a second merchant of the plurality of participating merchants for the account based on said account parameters, said denying including determining that the second merchant requesting the transaction does not comprise the subset of the plurality of participating merchants based on the merchant data.

21. The method of claim 20 further comprising:
receiving a request to activate a particular account;
verifying that the amount indicated by the value data has been funded by the client for the particular account; and
generating an activation status as a function of the funding verification, said generated activation status included in the account parameters wherein the client's status indicates one or more of the following: amount which is redeemable as a function of immediate funding by the client, amount which is redeemable as a function of subsequent funding, amount of card is immediately redeemable, amount which is redeemable after a certain time period, and amount which is redeemable for a limited amount.

22. The method of claim 20 wherein access to the account parameters is provided responsive to a transaction request received by an issuer processor via the card network provider for authorizing a transaction using the customized physical card, the customized virtual card, or both, said transaction initiated by a card user with a requesting merchant.

* * * * *